US011043903B2

(12) United States Patent
Ishizawa et al.

(10) Patent No.: US 11,043,903 B2
(45) Date of Patent: Jun. 22, 2021

(54) POWER SUPPLY AND MEDICAL SYSTEM

(71) Applicant: TDK CORPORATION, Tokyo (JP)

(72) Inventors: Kazuki Ishizawa, Tokyo (JP); Keita Fukudome, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 16/822,709

(22) Filed: Mar. 18, 2020

(65) Prior Publication Data

US 2020/0313564 A1 Oct. 1, 2020

(30) Foreign Application Priority Data

Mar. 28, 2019 (JP) .............................. JP2019-063981
Dec. 20, 2019 (JP) .............................. JP2019-229965

(51) Int. Cl.
*H02M 3/335* (2006.01)
(52) U.S. Cl.
CPC ... *H02M 3/33592* (2013.01); *H02M 3/33507* (2013.01); *H02M 3/33546* (2013.01)
(58) Field of Classification Search
None
See application file for complete search history.

(56) References Cited

U.S. PATENT DOCUMENTS

| | | | | |
|---|---|---|---|---|
| 6,304,462 B1* | 10/2001 | Balakrishnan | .......... | H02M 1/32 363/21.01 |
| 6,603,671 B2* | 8/2003 | Tokunaga | ........... | H02M 3/1588 363/17 |
| 7,759,911 B2* | 7/2010 | Omi | ..................... | H02M 3/1588 323/222 |
| 7,773,392 B2* | 8/2010 | Matsumoto | ....... | H02M 3/33592 363/21.07 |
| 8,054,655 B2* | 11/2011 | Moyer | .............. | H02M 3/33592 363/21.13 |
| 9,525,358 B2* | 12/2016 | Jin | ........................ | H02M 3/337 |
| 9,660,516 B2* | 5/2017 | Fogg | ................... | H02M 3/1588 |
| 2018/0269797 A1* | 9/2018 | Vemuri | ............. | H02M 3/33592 |
| 2020/0244186 A1* | 7/2020 | Park | ........................ | H02M 1/32 |

FOREIGN PATENT DOCUMENTS

JP 2004-80900 3/2004

\* cited by examiner

*Primary Examiner* — Jeffrey A Gblende
*Assistant Examiner* — Henry E Lee, III
(74) *Attorney, Agent, or Firm* — Greenblum & Bernstein, P.L.C.

(57) ABSTRACT

Reverse currents are prevented using existing components, like a primary-side current transformer. A power supply includes an isolation transformer, a switch, a synchronous rectifier, a smoother, a controller with a signal generator circuit that outputs main drive signals for main switching elements of the switch and drive signals for synchronous rectifier elements of the synchronous rectifier, and a current detector that has a current transformer, detects a current flowing to the switch, and outputs an output current detection signal. The controller includes an OR circuit that generates an OR signal for the main drive signals and a reverse current determination circuit that determines whether a reverse current has occurred based on the OR signal and the output current detection signal. When the occurrence of a reverse current has been determined, outputting of the main drive signals and the drive signals is stopped.

16 Claims, 7 Drawing Sheets

POWER SUPPLY AND MEDICAL SYSTEM

FIELD OF THE INVENTION

The present invention relates to a power supply that is equipped with a switch, which intermittently applies a direct current (DC) input voltage to a primary winding of a transformer, and a synchronous rectifier circuit, which includes a rectifying switching element and a freewheeling switching element and synchronously rectifies a voltage induced in a secondary winding of the transformer due to a switching operation of the switch to convert to a DC voltage, and also to a medical system equipped with this power supply.

DESCRIPTION OF THE RELATED ART

As one example of a power supply of this type, the power supply already proposed by the present applicant in Patent Literature 1 (Japanese Laid-open Patent Publication No. 2004-80900) is known. As depicted in FIG. 15, the power supply 81 includes: a transformer 82 with a primary winding 82a and a secondary winding 82b (note that an inductance 82c in the drawing is the leakage inductance on the secondary side); a switch 83 (for example, a single-ended forward switch) that includes a switching element 83a and intermittently applies a DC input voltage Vin to the primary winding 82a; a control circuit 84 that outputs a PWM pulse control signal S1; a current transformer 85 that is disposed on the primary side of the transformer 82, detects an output current Io outputted to a load (not illustrated), and outputs a detection signal S2; a delay circuit 86 that detects a rise in the PWM pulse control signal S1, decides a delay time corresponding to an increase or decrease in the output current Io indicated by the detection signal S2, delays the PWM pulse control signal S1 by this delay time, and outputs to a gate terminal of the switching element 83a as a drive signal S3; an isolation transformer 87 that electrically isolates the PWM pulse control signal S1 and outputs as a pulse control signal S4 to the secondary side of the transformer 82; a synchronous rectifier circuit 88 that includes a rectifying switching element 88a and a freewheeling switching element 88b, is connected to the secondary winding 82b, and rectifies and outputs an induced voltage generated in the secondary winding 82b; a drive circuit 89 that generates and outputs a drive signal S5 to the freewheeling switching element 88b based on the pulse control signal S4; and a smoothing circuit 90 that smoothes the rectified output from the synchronous rectifier circuit 88 and outputs an output voltage Vo to the load.

In this power supply 81, since the delay circuit 86 is configured to delay the PWM pulse control signal S1 by a delay time corresponding to the increase or decrease in the output current Io and output as the drive signal S3 to the gate terminal of the switching element 83a, even if the output timing of the induced voltage generated in the secondary winding 82b to the synchronous rectifier circuit 88 is affected by the inductance 82c (that is, the leakage inductance) and changes in keeping with the increase or decrease in the output current Io, it is possible to maintain appropriate on/off control timing for the rectifying switching element 88a and the freewheeling switching element 88b that construct the synchronous rectifier circuit 88. The power supply device 81 also has an overcurrent protection function, which is a fundamental function of a power supply for preventing the current value of the output current Io detected based on the detection signal S2 from reaching or exceeding a predetermined current value (that is, preventing an overcurrent from flowing). The function of determining the delay time corresponding to the increase or decrease in the output current Io is realized by using the existing current transformer 85 used for this overcurrent protection function as it is.

SUMMARY OF THE INVENTION

However, the power supply described above has the following problem to be solved. When the power supply described above is used to charge a secondary battery as a load and the DC input voltage Vin falls, the output voltage Vo will also fall due to this, but the synchronous rectifier circuit 88 will continue operating. With this power supply, when this reduced output voltage Vo falls below the charged voltage of the secondary battery, a current will flow from the secondary battery into the synchronous rectifier circuit 88 that is continuing to operate (that is, a reverse current occurs), resulting in the problem to be solved of the secondary battery being discharged.

The present invention was conceived in view of the problem described above and has a principal object of providing a power supply capable of preventing the occurrence of a reverse current with a simple configuration using existing component elements such as a current transformer disposed on the primary side, and a medical system equipped with this power supply.

To achieve the stated object, a power supply according to the present invention comprises: an isolation transformer including a primary winding and a secondary winding; a switch that is configured as one of a half-bridge circuit including two main switching elements and a push-pull circuit including two main switching elements, is connected between a pair of direct current (DC) power supply lines on which a DC input voltage is supplied, and intermittently applies the DC input voltage to the primary winding; a synchronous rectifier that includes a first synchronous rectifier element and a second synchronous rectifier element, is connected to the secondary winding, and rectifies and outputs an induced voltage generated in the secondary winding due to intermittent application of the DC input voltage to the primary winding; a smoother that smoothes a voltage outputted from the synchronous rectifier and outputs as a DC output voltage; a controller including a signal generator circuit that generates and outputs two main drive signals for driving the two main switching elements, a first drive signal for driving the first synchronous rectifier element, and a second drive signal for driving the second synchronous rectifier element; and a current detector including a current transformer, which is interposed on one DC power supply line out of the pair of DC power supply lines and outputs a voltage signal whose waveform changes in keeping with a current waveform of a current that flows to the switch, and a rectifier circuit, which rectifies the voltage signal and outputs as an output current detection signal, wherein the controller further includes: a logical OR circuit that generates a logical OR signal for the two main drive signals; and a reverse current determination circuit operable when outputting of the output current detection signal is detected, based on the logical OR signal and the output current detection signal, in a stopped period where the two main drive signals in the logical OR signal are in an outputting stopped state, to determine that a reverse current from the smoother to the synchronous rectifier has occurred and output a reverse current detection signal, and when the reverse current detection signal is outputted, the signal generator circuit stops outputting of the two main drive signals, the first drive signal, and the second drive signal.

A power supply according to the present invention comprises: an isolation transformer including a primary winding and a secondary winding; a switch that is configured as a full-bridge circuit composed of a pair of legs, which each include two main switching elements connected in series, that are connected in parallel, is connected across a pair of DC power supply lines on which a DC input voltage is supplied, and intermittently applies the DC input voltage to the primary winding; a synchronous rectifier that includes a first synchronous rectifier element and a second synchronous rectifier element, is connected to the secondary winding, and rectifies and outputs an induced voltage generated in the secondary winding due to intermittent application of the DC input voltage to the primary winding; a smoother that smoothes a voltage outputted from the synchronous rectifier and outputs as a DC output voltage; a controller including a signal generator circuit that generates and outputs four main drive signals for driving the four main switching elements, a first drive signal for driving the first synchronous rectifier element, and a second drive signal for driving the second synchronous rectifier element; and a current detector including a current transformer, which is interposed on one DC power supply line out of the pair of DC power supply lines and outputs a voltage signal whose waveform changes in keeping with a current waveform of a current that flows to the switch, and a rectifier circuit, which rectifies the voltage signal and outputs as an output current detection signal, wherein the controller further includes: a logical OR circuit that generates a logical OR signal for two main drive signals of the two main switching elements that construct one leg out of the pair of legs; and a reverse current determination circuit operable when outputting of the output current detection signal is detected, based on the logical OR signal and the output current detection signal, in a stopped period where the two main drive signals in the logical OR signal are in an outputting stopped state, to determine that a reverse current from the smoother to the synchronous rectifier has occurred and output a reverse current detection signal, and when the reverse current detection signal is outputted, the signal generator circuit stops outputting of the four main drive signals, the first drive signal, and the second drive signal.

Accordingly, with these power supplies, with a simple configuration that further uses the current detector, which is already provided to detect an overcurrent for the output current outputted from the power supplies, as a component element for detecting the occurrence of a reverse current, it is possible to detect the occurrence of a reverse current and to stop switching operations of the switch and the synchronous rectifier. This means that according to these power supplies, it is possible to prevent a situation where a reverse current continuously occurs. In addition, since these power supplies are configured to use the logical OR signal for the two main drive signals as a signal for determining whether a reverse current has occurred and it is possible to generate the logical OR signal merely by an OR element as hardware or an OR process as software, it is possible to detect the occurrence of a reverse current with a much simpler configuration.

In a power supply according to the present invention, the reverse current determination circuit determines that the reverse current has occurred by regarding a period when a voltage value of the logical OR signal has fallen below a predetermined first threshold voltage value as the stopped period and detecting when a voltage value of the output current detection signal has become equal to or greater than a predetermined second threshold voltage value as the output current detection signal being outputted.

Also, according to these power supplies, even when a certain amount of noise is superimposed on the low-side potential and high-side potential periods of the logical OR signal and/or the output current detection signal, the reverse current determination circuit is still capable of stably detecting the stopped period in the logical OR signal and outputting of the output current detection signal. As a result, the reverse current determination circuit is capable of stably determining the occurrence of a reverse current.

A medical system according to the present invention comprises: one of the power supplies described above that further includes a pair of alternating current (AC) input terminals connected to an input line, a primary-side rectifier/smoother that is connected via a pair of AC power supply lines to the pair of AC input terminals and rectifies and smoothes an AC input voltage, which is inputted via the input line, the pair of AC input terminals, and the pair of AC power supply lines, and supplies as the DC input voltage to the pair of DC power supply lines, and a fuse or a breaker interposed on the pair of AC power supply lines; and a medical appliance that is connected downstream of the power supply and operates based on the DC output voltage from the power supply.

Accordingly, with this medical system, for a configuration where the isolation transformer is an isolation transformer with reinforced insulation, by further providing a fuse or a breaker on the pair of power supply lines, it is possible to achieve a configuration where the power supply alone is capable of achieving medical standards. This means that it is possible to realize a configuration capable of achieving medical standards without interposing an isolation transformer and a fuse (or a breaker) outside the power supply (in more detail, on an input line connected to the power supply). Also, according to this medical system, by including the power supply described above, it is possible to achieve the same effects as the power supply alone described above.

A medical system according to the present invention comprises: one of the power supplies described above that further includes a pair of AC input terminals connected to an input line and a primary-side rectifier/smoother that is connected to the pair of AC input terminals and rectifies and smoothes an AC input voltage, which is inputted via the input line and the pair of AC input terminals, and supplies as the DC input voltage to the pair of DC power supply lines; a fuse or a breaker interposed on the input line; and a medical appliance that is connected downstream of the power supply and operates based on the DC output voltage from the power supply.

Accordingly, with this medical system, for a configuration where the isolation transformer is an isolation transformer with reinforced insulation, it is possible to realize a configuration capable of achieving medical standards by merely interposing a fuse (or a breaker) outside the power supply (in more detail, on an input line connected to the power supply). Also, according to this medical system, by including the power supply described above, it is possible to achieve the same effects as the power supply alone described above.

A medical system according to the present invention comprises: one of the power supplies described above that further includes a pair of AC input terminals connected to an input line, a primary-side rectifier/smoother that is connected via a pair of AC power supply lines to the pair of AC input terminals and rectifies and smoothes an AC input voltage, which is inputted via the input line, the pair of AC input terminals, and the pair of AC power supply lines, and supplies as the DC input voltage to the pair of DC power supply lines, and a first fuse or a first breaker interposed on one AC power supply line out of the pair of AC power supply lines; a second fuse or a second breaker interposed on the input line connected via the AC input terminal to another AC power supply line out of the pair of AC power supply lines; and a medical appliance that is connected downstream of the power supply and operates based on the DC output voltage from the power supply.

Accordingly, with this medical system, for a configuration where the isolation transformer is an isolation transformer with reinforced insulation, since a first fuse or a first breaker interposed on one of the power supply lines is also internally provided, it is possible, by merely interposing a second fuse or a second breaker outside the power supply (in more detail, on an input line connected to the other power supply line out of the input lines connected to the power supply), to realize a configuration capable of achieving medical standards. Also, according to this medical system, by including the power supply described above, it is possible to achieve the same effects as the power supply alone described above.

That is, according to the present invention, with a simple configuration that further uses the current detector, which is already provided to detect an overcurrent for the output current outputted from the power supplies, as a component element for detecting the occurrence of a reverse current, it is possible to detect the occurrence of a reverse current and to stop switching operations of the switch and the synchronous rectifier. In addition, since these power supplies are configured to use the logical OR signal for the two main drive signals as a signal for determining whether a reverse current has occurred and it is possible to generate the logical OR signal merely by an OR element as hardware or an OR process as software, it is possible to detect the occurrence of a reverse current with a much simpler configuration.

It should be noted that the disclosure of the present invention relates to the contents of Japanese Patent Application No. 2019-063981 that was filed on Mar. 28, 2019, and Japanese Patent Application No. 2019-229965 that was filed on Dec. 20, 2019, the entire contents of which are herein incorporated by reference.

BRIEF DESCRIPTION OF THE DRAWINGS

These and other objects and features of the present invention will be explained in more detail below with reference to the attached drawings, wherein.

DESCRIPTION OF THE PREFERRED EMBODIMENTS

Figure 1:
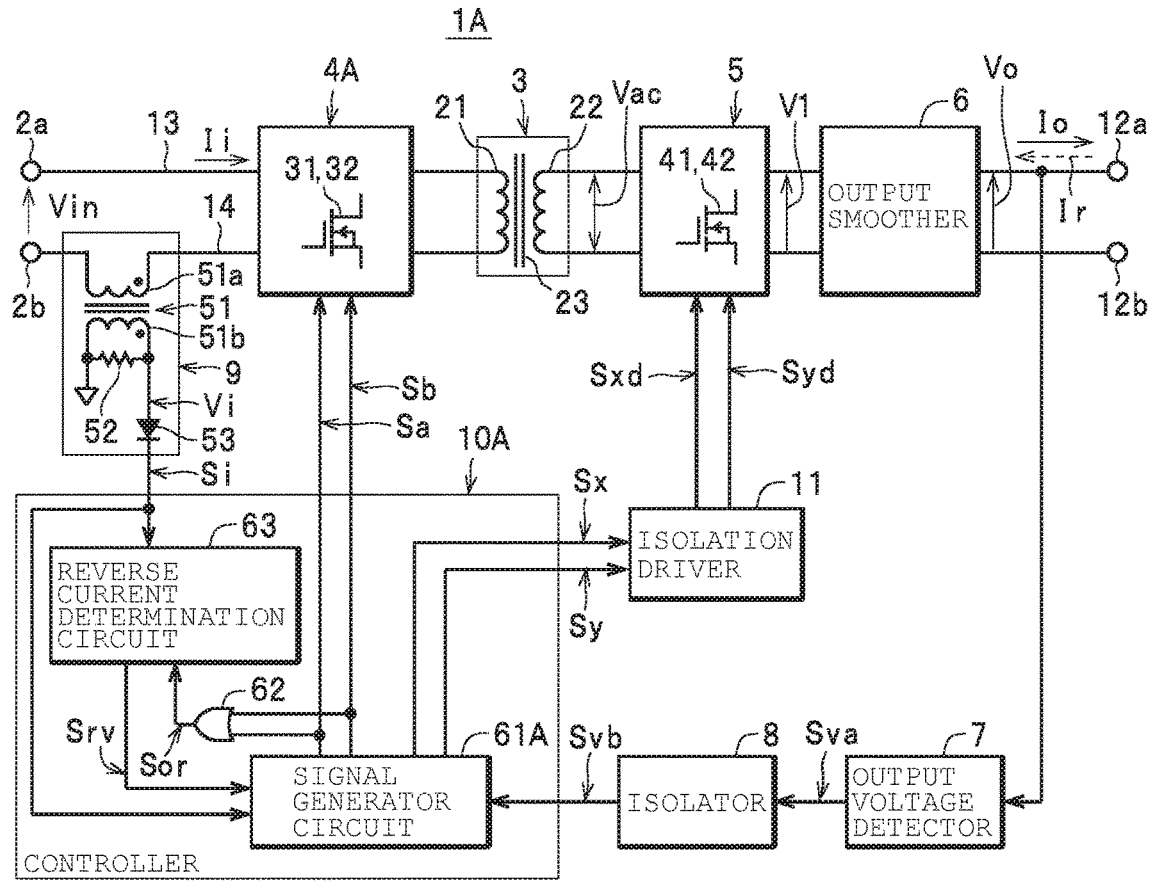
FIG. 1 is a block diagram depicting the configuration of a power supply.

Preferred embodiments of a power supply and a medical system will now be described with reference to the attached drawings.

First, the configuration of a power supply 1A as one example of a power supply according to the present invention will be described with reference to FIGS. 1 and 2. As one example, the power supply 1A includes a pair of input terminals 2a and 2b (hereinafter collectively referred to as the "input terminals 2" when no distinction is made between them), an isolation transformer 3, a switch 4A, a synchronous rectifier 5, a smoother (hereinafter also referred to as the "output smoother") 6, an output voltage detector 7, an isolator 8, a current detector 9, a controller 10A, an isolation driver 11, and a pair of output terminals 12a and 12b (hereinafter collectively referred to as the "output terminals 12" when no distinction is made between them). The power supply 1 generates a DC output voltage Vo based on a DC input voltage Vin inputted across the input terminals 2a and 2b (that is, a DC voltage where the potential at the input terminal 2a is a high potential with the potential at the input terminal 2b as a reference) and outputs to a load (for example, an electronic appliance such as a medical appliance, not illustrated) connected across the output terminals 12a and 12b (that is, the power supply 1A outputs in a state where the potential at the output terminal 12a is a high potential with the potential at the output terminal 12b as a reference).

The isolation transformer 3 includes a primary winding 21, a secondary winding 22, and a shared magnetic core 23 that magnetically couples the primary winding 21 and the secondary winding 22.

The switch 4A has a circuit configuration that is one of a half-bridge circuit and a push-pull circuit and includes two main switching elements 31 and 32. The switch 4A is connected between a pair of DC power supply lines 13 and 14 on which the DC input voltage Vin is supplied, and due to the main switching elements 31 and 32 alternately switching, the DC input voltage Vin is intermittently applied to the primary winding 21. By doing so, an AC voltage (an induced voltage) Vac is induced in the secondary winding 22 of the isolation transformer 3. The main switching elements 31 and 32 are configured of n-channel MOSFETs as one example, but are not limited to this configuration and it is possible to use a variety of semiconductor switches, such as bipolar transistors.

Figure 2:
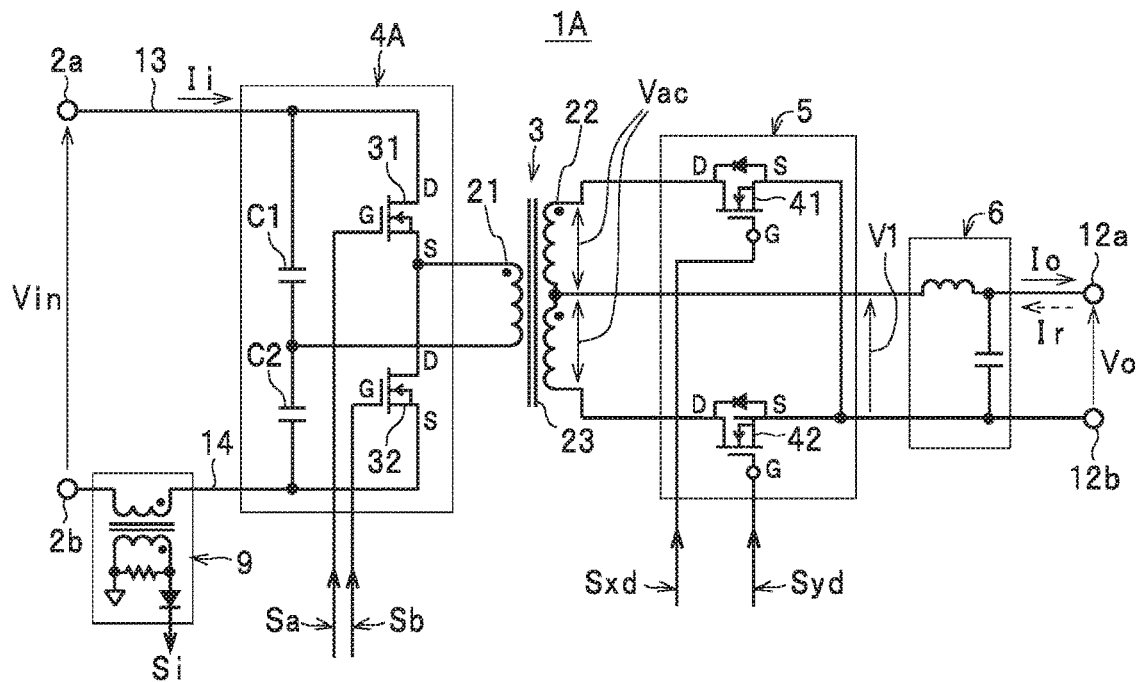
FIG. 2 is a circuit diagram depicting one example of a switch with a half-bridge configuration, an isolation transformer, a synchronous rectifier, and an output smoother.

In more detail, as depicted in FIG. 2, when the switch 4A is configured as a half-bridge circuit, the switch 4A is equipped with two capacitors C1 and C2 in addition to the main switching elements 31 and 32. With this circuit configuration, in a state where the source terminal of the main switching element 31 in the upper arm (that is, the high side) and the drain terminal of the main switching element 32 in the lower arm (that is, the low side) are connected (a state where the main switching elements 31 and 32 are connected in series), by connecting the drain terminal of the main switching element 31 in the upper arm to the DC power supply line 13 and the source terminal of the main switching element 32 in the lower arm to the DC power supply line 14, the main switching elements 31 and 32 are connected across the pair of DC power supply lines 13 and 14. The two capacitors C1 and C2 are also connected to each other in series, and due to the capacitor C1 on the high side being connected to the DC power supply line 13 and the capacitor C2 on the low side being connected to the DC power supply line 14, are connected across the pair of DC power supply lines 13 and 14.

As one example in the present embodiment, the isolation transformer 3 has a center tap provided on the secondary winding 22. One end of the primary winding 21 of the isolation transformer 3 is connected to a connection point between the main switching elements 31 and 32 and the other end is connected to a connection point between the capacitors C1 and C2.

The synchronous rectifier 5 includes a first synchronous rectifier element 41 and a second synchronous rectifier element 42, is connected to the secondary winding 22, performs synchronous rectification of the AC voltage Vac induced in the secondary winding 22, and outputs a voltage V1. Although the first synchronous rectifier element 41 and the second synchronous rectifier element 42 are constructed of n-channel MOSFETs as one example, these elements are not limited to this configuration and it is possible to use a configuration such as a parallel circuit with a bipolar transistor and a diode.

In more detail, in the synchronous rectifier 5, the source terminals of the first synchronous rectifier element 41 and the second synchronous rectifier element 42 are connected together. The drain terminal of the first synchronous rectifier element 41 is connected to one terminal of the secondary winding 22 and the drain terminal of the second synchronous rectifier element 42 is connected to the other terminal of the secondary winding 22. Also, although not illustrated, the isolation transformer 3 can be configured with a secondary winding 22 that does not have a center tap. Here, although not illustrated, it is possible to configure the synchronous rectifier 5 with the first synchronous rectifier element 41 connected as a synchronous rectifier element used for rectification between one end of the secondary winding 22 and the output smoother 6 and the second synchronous rectifier element 42 connected as a synchronous rectifier element used for commutation between the one end and the other end of the secondary winding 22. Also, although not illustrated, the synchronous rectifier 5 can be configured to further include another two synchronous rectifier elements of the same configuration as the first synchronous rectifier element 41 and the second synchronous rectifier element 42 and have the four synchronous rectifier elements connected in a full-bridge arrangement.

As one example, the output smoother 6 has a series circuit composed of a coil and a capacitor connected between the center tap of the secondary winding 22 and the source terminals of the synchronous rectifier elements 41 and 42, and is configured as an LC filter for smoothing the voltage V1 outputted between the center tap and the source terminals to produce the DC output voltage Vo. The output smoother 6 outputs the generated DC output voltage Vo to a load, not illustrated, connected across the output terminals 12. Note that although not illustrated, the output smoother 6 is also capable of being constructed of a capacitor connected between the center tap of the secondary winding 22 and the source terminals of the synchronous rectifier elements 41 and 42.

Figure 3:
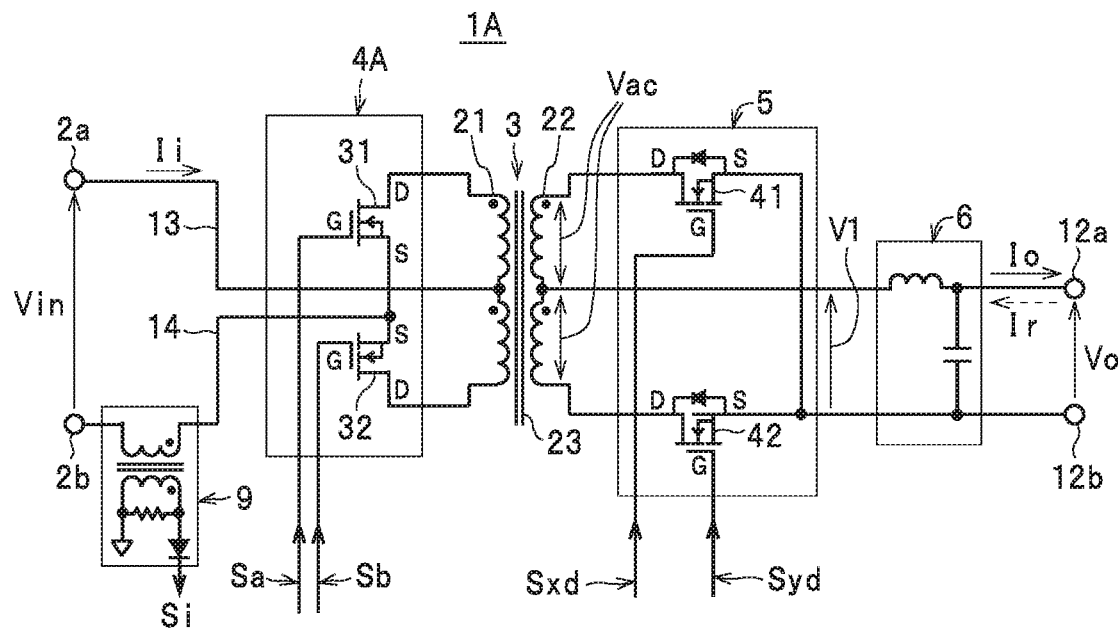
FIG. 3 is a circuit diagram depicting one example of a switch with a push-pull configuration, an isolation transformer, a synchronous rectifier, and an output smoother.

As depicted in FIG. 3, when constructed as a push-pull circuit, the switch 4A includes the main switching elements 31 and 32. When the switch 4A is configured as the push-pull circuit, the primary winding 21 in the isolation transformer 3 is provided with a center tap corresponding to this configuration. In a state where the source terminals are connected together (that is, connected to each other in series), the main switching elements 31 and 32 are connected in parallel to the primary winding 21 with the drain terminal of the main switching element 31 connected to one end of the primary winding 21 and the drain terminal of the main switching element 32 connected to the other end of the primary winding 21. The center tap of the primary winding 21 is connected to the DC power supply line 13 and the source terminals of the main switching elements 31 and 32 are connected to the DC power supply line 14. Note that since the secondary winding 22, the synchronous rectifier 5, and the output smoother 6 are the same as when the switch 4A is constructed of the half-bridge circuit described above, the same reference numerals have been assigned and description has been omitted.

The output voltage detector 7 inputs the DC output voltage Vo and outputs a voltage detection signal Sva whose voltage value changes in proportion to the voltage value of the DC output voltage Vo. The isolator 8 is constructed of a pulse transformer, a photocoupler, or the like and, when the voltage detection signal Sva is inputted, converts to another voltage detection signal Svb (a signal whose voltage value changes in proportion to the voltage value of the voltage detection signal Sva) that is electrically isolated from circuits on the secondary side (that is, the secondary winding 22, the synchronous rectifier 5, and the output smoother 6) of the isolation transformer 3 and outputs to the primary side of the isolation transformer 3.

The current detector 9 includes a current transformer 51, a resistor 52, and a rectifier circuit 53. In the current transformer 51, a primary winding 51a is interposed on one out of the pair of DC power supply lines 13 and 14 (as one example in the present embodiment, the DC power supply line 14). The resistor 52 is connected across both ends of the secondary winding 51b of the current transformer 51, and one end of the secondary winding 51b is connected to a primary-side reference potential (or a "primary-side ground") of the isolation transformer 3.

Figure 4:
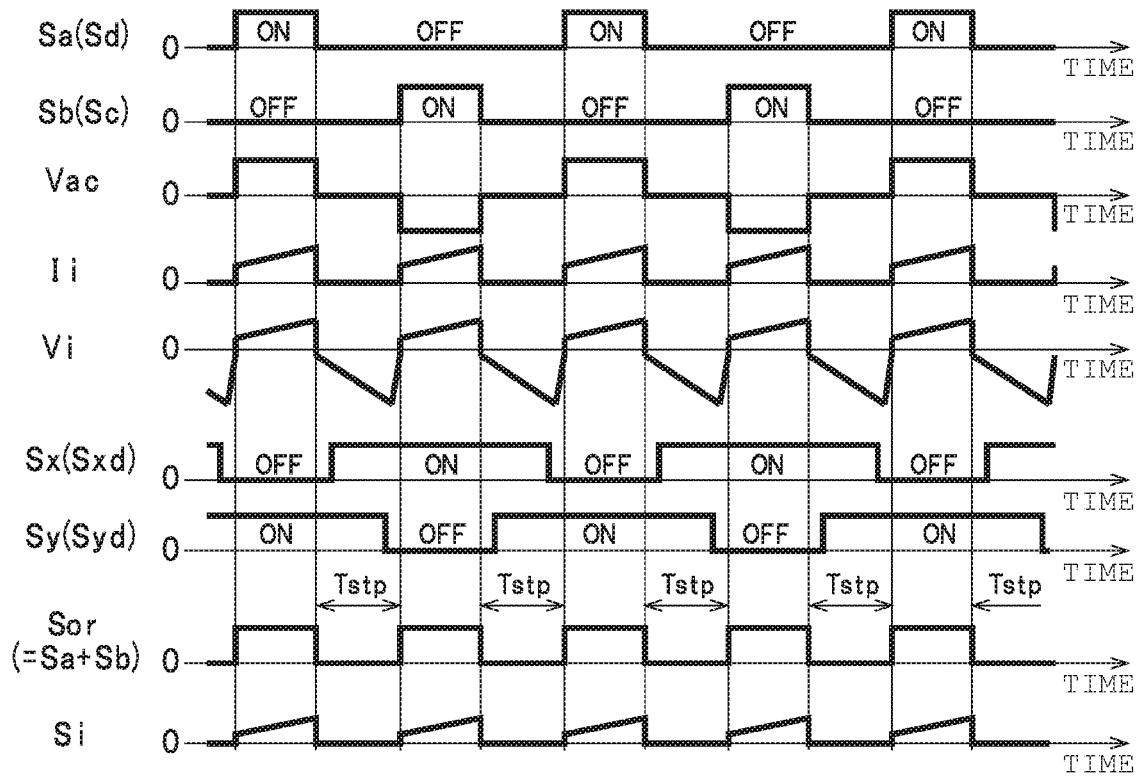
FIG. 4 is a waveform diagram useful in explaining the operation of the power supply in a normal state (a state where an output current is flowing from the power supply to a load)
Figure 5:
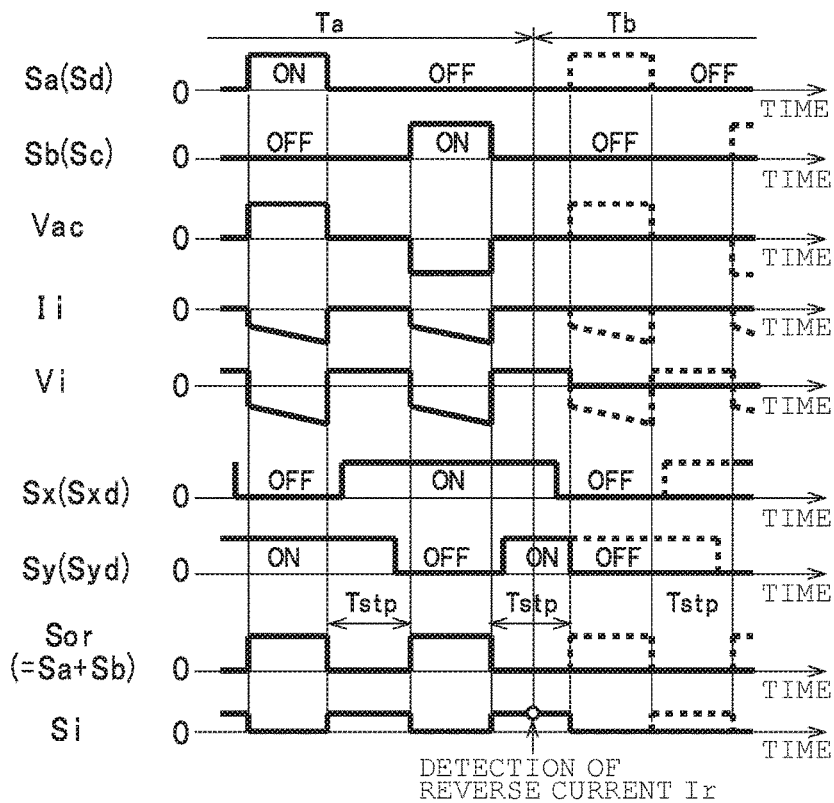
FIG. 5 is a waveform diagram useful in explaining the operation of the power supply in a reverse current state (a state where a reverse current is flowing from the load toward the power supply)

With this configuration, a voltage signal Vi of a signal waveform depicted in FIGS. 4 and 5 is generated at the other end of the secondary winding 51b of the current transformer 51. In the power supply 1A, in a normal state (a state where the output current Io is flowing from the power supply 1A toward the load), a current Ii flows to the switch 4A in the direction (the forward direction) indicated in FIGS. 1, 2, and 3 during an ON period of the main switching element 31 that corresponds to a main drive signal Sa described later (that is, is driven by the main drive signal Sa to perform switching) and an ON period of the main switching element 32 that corresponds to a main drive signal Sb, described later (that is, is driven by the main drive signal Sb to perform switching). As depicted in FIG. 4, the voltage signal Vi is outputted as a signal with a positive-side waveform during these ON periods. During an OFF period where both of the main switching elements 31 and 32 are off (also referred to as a "stopped period Tstp" described later), a reset current (a current in the opposite direction to the current that flows during the ON period) flows via the resistor 52 to the secondary winding 51b of the current transformer 51. For this reason, as depicted in FIG. 4, the voltage signal Vi is outputted as a signal composed of a negative-side waveform during this OFF period.

On the other hand, with the power supply 1A, in a reverse current state (a state where a reverse current Ir flows from the load toward the power supply 1A), the current Ii flows in the reverse direction to the direction indicated in FIGS. 1, 2, and 3 at the switch 4A in each ON period of the main switching elements 31 and 32. For this reason, like a period Ta indicated in FIG. 5, during the ON period, the voltage signal Vi is outputted as a signal composed of a negative-side waveform. Also, in the OFF period where both main switching elements 31 and 32 are off (the stopped period Tstp described later), the reset current (a current in the opposite direction to the current that flows during an ON period) flows via the resistor 52 to the secondary winding 51b of the current transformer 51. This means that during the OFF period, the voltage signal Vi is outputted as a signal composed of a positive-side waveform as in the period Ta indicated in FIG. 5.

The rectifier circuit 53 is composed of a diode, for example, has its anode connected to the other end of the secondary winding 51b of the current transformer 51, and rectifies the voltage signal Vi generated at the other end to generate an output current detection signal Si composed of the positive-side waveform of the voltage signal Vi as depicted in FIGS. 4 and 5. This output current detection signal Si is outputted from the cathode to the controller 10A.

When the power supply 1A is in the normal state, as depicted in FIG. 4, the output current detection signal Si is outputted during the ON period described above as a voltage signal with a positive-side waveform that is proportionate to the current waveform of the current Ii and is outputted during the OFF period described above as a voltage signal that is effectively zero volts. This means when the power supply 1A is in the normal state, the output current detection signal Si is a signal whose average value changes in keeping with the current value of the output current Io flowing to the output terminals 12.

On the other hand, when the power supply 1A is in the reverse current state, the signal waveform of the voltage signal Vi has reverse polarity to the polarity of the signal waveform during the normal state described above in both the ON period and the OFF period. For this reason, as in the period Ta depicted in FIG. 5, the output current detection signal Si is outputted during the ON period described above as a voltage signal with zero volts and is outputted during the OFF period described above as a voltage signal with a positive-side waveform, which is the opposite to during the normal state described above.

As one example, the controller 10A includes a signal generator circuit 61A, a logical OR circuit 62, and a reverse current determination circuit 63.

The signal generator circuit 61A inputs the voltage detection signal Svb, generates the two main drive signals Sa and Sb for driving the main switching elements 31 and 32 based on the voltage value of the DC output voltage Vo indicated by the voltage detection signal Svb with the timing depicted in FIGS. 4 and 5, and outputs the main drive signals Sa and Sb to the gate terminals of the corresponding main switching elements 31 and 32. The signal generator circuit 61A also controls the duty ratios of the main drive signals Sa and Sb to control the on-duties of the main switching elements 31 and 32 and thereby perform control to set the voltage value of the DC output voltage Vo at a predetermined target voltage value. The signal generator circuit 61A determines whether the current value of the output current Io detected based on the output current detection signal Si has reached a predetermined upper limit current value (that is, whether there is an overcurrent), and when the current value of the output current Io has reached the upper limit current value (that is, there is an overcurrent), controls the duty ratio of the main drive signals Sa and Sb to control the on-duties of the main switching elements 31 and 32. By doing so, the signal generator circuit 61A performs control that lowers the voltage value of the DC output voltage Vo so that the current value of the output current Io does not exceed the upper limit current value. As depicted in FIGS. 4 and 5, the signal generator circuit 61A also generates and outputs a first drive signal Sx for driving the first synchronous rectifier element 41 and a second drive signal Sy for driving the second synchronous rectifier element 42 based on the generation timing of the main drive signals Sa and Sb. When a reverse current detection signal Srv, described later, is outputted from the reverse current determination circuit 63, the signal generator circuit 61A stops outputting the two main drive signals Sa and Sb, the first drive signal Sx, and the second drive signal Sy.

As depicted in FIGS. 4 and 5, based on the main drive signals Sa and Sb, the logical OR circuit 62 generates and outputs a logical OR signal Sor (=Sa+Sb) for the main drive signals Sa and Sb. Based on the logical OR signal Sor and the output current detection signal Si, the reverse current determination circuit 63 detects whether the output current detection signal Si is being outputted during the stopped period Tstp where the two main drive signals Sa and Sb in the logical OR signal Sor are both in an outputting stopped state. When outputting of the output current detection signal Si during the stopped period Tstp has been detected, the reverse current determination circuit 63 determines that a reverse current from the output smoother 6 to the synchronous rectifier 5 has occurred and outputs the reverse current detection signal Srv to the signal generator circuit 61A.

Here, a case where the reverse current determination circuit 63 has a configuration that detects a stopped period Tstp in the logical OR signal Sor (that is, a configuration that detects whether the logical OR signal Sor is in a stopped period Tstp state) and a configuration that detects whether the output current detection signal Si is being outputted will be described.

Figure 13:
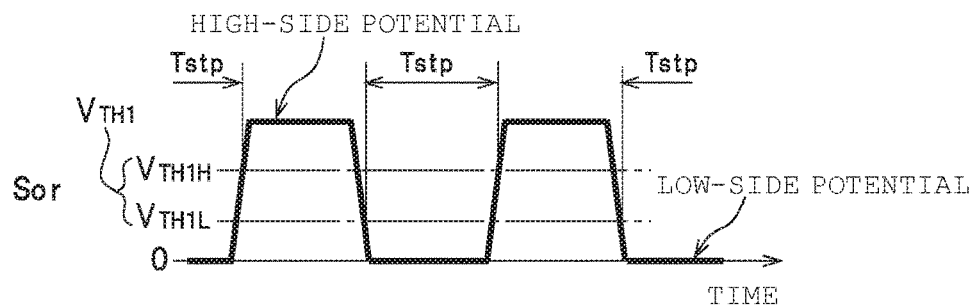
FIG. 13 is a diagram useful in explaining the relationship between a logical OR signal and first threshold voltage values.

First, when detecting the stopped period Tstp, as depicted in FIG. 13, the reverse current determination circuit 63 performs detection on the logical OR signal Sor using predetermined first threshold voltage values $V_{TH1}$ (in the present embodiment, two threshold voltage values, the high-side first threshold voltage value $V_{TH1H}$ and the low-side first threshold voltage value $V_{TH1L}$). The relationship indicated below is established for the high-side first threshold voltage value $V_{TH1H}$ and the low-side first threshold voltage value $V_{TH1L}$.

High-side potential of logical OR signal Sor>high-side first threshold voltage value $V_{TH1H}$>low-side first threshold voltage value $V_{TH1L}$>low-side potential of logical OR signal Sor In more detail, as depicted in FIG. 13, the logical OR signal Sor is a repeating signal whose voltage value changes so as to start to rise from the low-side potential, pass the low-side first threshold voltage value $V_{TH1L}$ and then the high-side first threshold voltage value $V_{TH1H}$ to reach the high-side potential and after that start to fall from the high-side potential and then pass the high-side first threshold voltage value $V_{TH1H}$ and then the low-side first threshold voltage value $V_{TH1L}$ to reach the low-side potential.

The reverse current determination circuit 63 detects the time where the voltage value of the logical OR signal Sor, whose voltage value changes as described above, starts to fall from the high-side potential, falls below the high-side first threshold voltage value $V_{TH1H}$ and then falls further to reach the low-side first threshold voltage value $V_{TH1L}$ as a start time of the stopped period Tstp. After this, the reverse current determination circuit 63 detects the time where the voltage value of the logical OR signal Sor starts to rise from the low-side potential, rises above the low-side first threshold voltage value $V_{TH1L}$ and then reaches the high-side first threshold voltage value $V_{TH1H}$ as an end time of the stopped period Tstp. By doing so, the reverse current determination circuit 63 detects the stopped period Tstp in the logical OR signal Sor. That is, the reverse current determination circuit 63 functions as a circuit with a so-called hysteresis characteristic, and by detecting the stopped period Tstp in the logical OR signal Sor, is capable of stably detecting the stopped period Tstp even when a certain amount of noise is superimposed on the logical OR signal Sor (that is, not only when a certain amount of noise is superimposed on the logical OR signal Sor when at the low-potential side and when at the high-potential side but also when a certain amount of noise is superimposed as the voltage value moves from the low-potential side to the high-potential side and from the high-potential side to the low-potential side).

Figure 14:
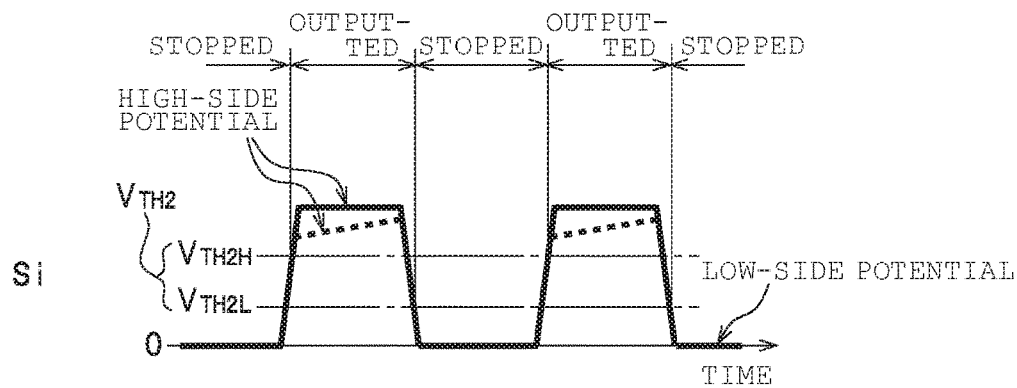
FIG. 14 is a diagram useful in explaining the relationship between an output current detection signal and second threshold voltage values.
Figure 15:
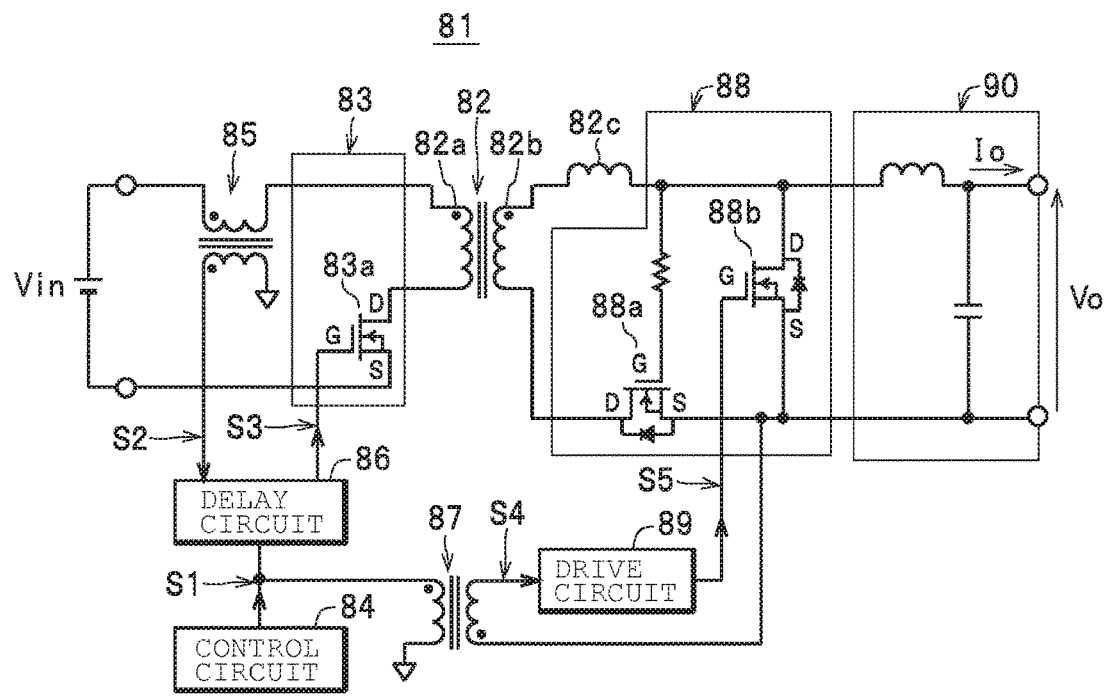
FIG. 15 is a block diagram depicting the configuration of a conventional power supply.

Next, when detecting whether the output current detection signal Si is being outputted, as depicted in FIG. 14, the reverse current determination circuit 63 performs detection of the output current detection signal Si using predetermined second threshold voltage values $V_{TH2}$ (in the present embodiment, two threshold voltage values, the high-side second threshold voltage value $V^{TH2H}$ and the low-side second threshold voltage value $V_{TH2L}$). The relationship indicated below is established for the high-side second threshold voltage value $V_{TH2H}$ and the low-side second threshold voltage value $V_{TH2L}$. Note that the waveform of the output current detection signal Si indicated by the solid line in FIG. 14 indicates the waveform of the output current detection signal Si depicted in FIG. 5 and the waveform indicated by the broken line indicates the waveform of the high-side potential part depicted in FIG. 4.

High-side potential of output current detection signal Si>high-side second threshold voltage value $V_{TH2H}$>low-side second threshold voltage value $V_{TH2L}$>low-side potential of output current detection signal Si In more detail, as depicted in FIG. 14, the output current detection signal Si is a repeating signal whose voltage value changes so as to start to rise from the low-side potential, pass the low-side second threshold voltage value $V_{TH2L}$ and then the high-side second threshold voltage value $V_{TH2H}$ to reach the high-side potential and after that start to fall from the high-side potential and pass the high-side second threshold voltage value $V_{TH2H}$ and then the low-side second threshold voltage value $V_{TH2L}$ to reach the low-side potential.

The reverse current determination circuit 63 detects the time where the voltage value of the output current detection signal Si, whose voltage value changes as described above, starts to rise from the low-side potential, rises above the low-side second threshold voltage value $V_{TH2L}$ and then rises further to reach the high-side second threshold voltage value $V_{TH2H}$ as an outputting start time of the output current detection signal Si. After this, the reverse current determination circuit 63 detects the time where voltage value of the output current detection signal Si starts to fall from the high-side potential, falls below the high-side second threshold voltage value $V_{TH2H}$ and then falls further to reach the low-side second threshold voltage value $V_{TH2L}$ as an outputting stop time of the output current detection signal Si. By doing so, the reverse current determination circuit 63 detects whether the output current detection signal Si is being outputted. That is, the reverse current determination circuit 63 functions as a circuit with a so-called hysteresis characteristic, and by detecting the outputting and the stopping of outputting of the output current detection signal Si, is capable of stably detecting the outputting and the stopping of outputting even when a certain amount of noise is superimposed on the output current detection signal Si (that is, not only when a certain amount of noise is superimposed on the output current detection signal Si at the low-potential side and at the high-potential side but also when a certain amount of noise is superimposed as the voltage value moves from the low-potential side to the high-potential side and from the high-potential side to the low-potential side).

Note that the high-side first threshold voltage value $V_{TH1H}$ and the high-side second threshold voltage value $V_{TH2H}$ may be the same value or may be different values. Likewise, the low-side first threshold voltage value $V_{TH1L}$ and the low-side second threshold voltage value $V_{TH2L}$ may be the same value or may be different values.

The present invention is not limited to a configuration that uses two threshold voltage values, the high-side first threshold voltage value $V_{TH1H}$ and the low-side first threshold voltage value $V_{TH1L}$, as the first threshold voltage value $V_{TH1}$, and it is also possible to use a configuration that uses one threshold voltage value (in the example described above, where high-side first threshold voltage value $V_{TH1H}$=low-side first threshold voltage value $V_{TH1L}$). Similarly, the present invention is not limited to a configuration that uses two threshold voltage values, the high-side second threshold voltage value $V_{TH2H}$ and the low-side second threshold voltage value $V_{TH2L}$, as the second threshold voltage value $V_{TH2}$, and it is also possible to use a configuration that uses one threshold voltage value (in the example described above, where high-side second threshold voltage value $V_{TH2H}$=low-side second threshold voltage value $V_{TH2L}$). That is, the reverse current determination circuit 63 may use a configuration that does not have a hysteresis characteristic. With this configuration also, even when an amount of noise is superimposed on the logical OR signal Sor and/or the output current detection signal Si when at the low-side potential and when at the high-side potential, the reverse current determination circuit 63 is still capable of stably detecting the stopped periods Tstp in the logical OR signal Sor and the outputting and the stopping of outputting of the output current detection signal Si.

As one example, the isolation driver 11 is composed of a pulse transformer, a photocoupler, or the like and when the first drive signal Sx and the second drive signal Sy are inputted, converts to a new first drive signal Sxd and a second drive signal Syd (signals that are synchronized with the corresponding signal out of the first drive signal Sx and the second drive signal Sy) that are electrically isolated from the circuits on the primary side of the isolation transformer 3 (that is, the primary winding 21, the switch 4A, the controller 10A and the like), and outputs to the first synchronous rectifier element 41 and the second synchronous rectifier element 42.

Next, the operation of the power supply 1A will be described.

In the power supply 1A, the signal generator circuit 61A of the controller 10A generates the main drive signals Sa and Sb at the timing depicted in FIG. 4 and outputs to the main switching elements 31 and 32 of the switch 4A. Due to this, in the switch 4A, the main switching elements 31 and 32 switch alternately to intermittently apply the DC input voltage Vin to the primary winding 21 of the isolation transformer 3. As a result, the AC voltage Vac with the voltage waveform depicted in FIG. 4 is induced at the timing depicted in FIG. 4 in the secondary winding 22 of the isolation transformer 3.

At the timing depicted in FIG. 4, the signal generator circuit 61A generates the first drive signal Sx and the second drive signal Sy and outputs to the isolation driver 11. The isolation driver 11 converts the first drive signal Sx and the second drive signal Sy to the first drive signal Sxd and the second drive signal Syd that are electrically isolated from the drive signals Sx and Sy and outputs to the synchronous rectifier 5. By doing so, at the synchronous rectifier 5, the first synchronous rectifier element 41 performs switching based on the first drive signal Sxd and the second synchronous rectifier element 42 performs switching based on the second drive signal Syd, resulting in synchronous rectification of the AC voltage Vac and the outputting of the voltage V1. The output smoother 6 inputs and smoothes the voltage V1 (that is, removes high-frequency components such as switching noise included in the voltage V1) and outputs as the DC output voltage Vo to the output terminals 12. By doing so, the DC output voltage Vo is supplied to a load, not illustrated, connected across the output terminals 12.

In the power supply 1A, the output voltage detector 7 outputs the voltage detection signal Sva whose voltage value changes in proportion to the voltage value of the DC output voltage Vo and the isolator 8 converts the voltage detection signal Sva to the voltage detection signal Svb that is electrically isolated and outputs to the signal generator circuit 61A.

In the power supply 1A, the current detector 9 detects the current Ii that flows to the switch 4A, generates the output current detection signal Si, and outputs to the controller 10A.

In the controller 10A, the signal generator circuit 61A inputs the voltage detection signal Svb and performs control, by controlling the on-duties of the main switching elements 31 and 32 by controlling the duty ratios of the main drive signals Sa and Sb outputted to the two main switching elements 31 and 32 based on the voltage value of the DC output voltage Vo indicated by the voltage detection signal Svb, to set the voltage value of the DC output voltage Vo at the predetermined target voltage value. The signal generator circuit 61A determines whether the current value of the output current Io detected based on the output current detection signal Si has reached the predetermined upper limit current value (that is, whether there is an overcurrent), and when the current value of the output current Io has reached the upper limit current value (that is, when there is an overcurrent), the signal generator circuit 61A controls the duty ratios of the main drive signals Sa and Sb to control the on-duties of the main switching elements 31 and 32 (more specifically, the signal generator circuit 61A executes control that lowers the duty ratios to lower the on-duties) to lower the voltage value of the DC output voltage Vo and thereby prevent the current value of the output current Io from exceeding the upper limit current value.

In the controller 10A, the logical OR circuit 62 generates the logical OR signal Sor from the main drive signals Sa and Sb as depicted in FIGS. 4 and 5 and outputs to the reverse current determination circuit 63. The reverse current determination circuit 63 detects, based on the logical OR signal Sor and the output current detection signal Si, whether the output current detection signal Si is being outputted in the stopped period Tstp, where the two main drive signals Sa and Sb in the logical OR signal Sor are both in the outputting stopped state.

Here, as described above, when the power supply 1A is in the normal state (the state where the output current Io is flowing from the power supply 1A toward the load), as depicted in FIG. 4, the output current detection signal Si composed of the positive-side waveform of the voltage signal Vi is kept at effectively zero volts (that is, the output current detection signal Si is not outputted) during the OFF period (that is, the stopped period Tstp). Since the reverse current determination circuit 63 does not detect outputting of the output current detection signal Si in the stopped period Tstp, the reverse current determination circuit 63 determines that a reverse current Ir from the output smoother 6 to the synchronous rectifier 5 has not occurred, and accordingly does not output the reverse current detection signal Srv. Accordingly, in the controller 10A, without executing the operation when the generation of the reverse current Ir has occurred (that is, an operation that stops the outputting of the two main drive signals Sa and Sb, the first drive signal Sx, and the second drive signal Sy), the signal generator circuit 61A continuously executes the operation described above that performs control to set the voltage value of the DC output voltage Vo at the predetermined target voltage value and the operation described above that determines whether the current value of the output current Io has reached the upper limit current value (that is, determination of whether there is an overcurrent).

On the other hand, as described above, when the power supply 1A is in the reverse current state (a state where a reverse current Ir is flowing from the load toward the power supply 1A), the output current detection signal Si composed of the positive-side waveform of the voltage signal Vi is outputted as a voltage signal with a positive-side waveform in the OFF period (that is, the stopped period Tstp) like in the period Ta depicted in FIG. 5. Since the outputting of the output current detection signal Si in the stopped period Tstp is detected, the reverse current determination circuit 63 determines that a reverse current Ir from the output smoother 6 to the synchronous rectifier 5 has occurred and outputs the reverse current detection signal Srv. Accordingly, in the controller 10A, the signal generator circuit 61A executes the operation when the occurrence of a reverse current Ir has been detected (that is, an operation that stops the outputting of the two main drive signals Sa and Sb, the first drive signal Sx, and the second drive signal Sy). By doing so, due to the output operation of the DC output voltage Vo by the power supply 1A stopping, the AC voltage Vac, the current Ii, the voltage signal Vi, the logical OR signal Sor, and the output current detection signal Si change to the state in a period Tb depicted in FIG. 5.

Note that although the period Ta until the reverse current determination circuit 63 detects the outputting of the output current detection signal Si in the stopped period Tstp has been drawn longer than reality in FIG. 5 for ease of explaining the states of the respective signals in the reverse current state, since the reverse current determination circuit 63 normally outputs the reverse current detection signal Srv when the outputting of the output current detection signal Si in the stopped period Tstp is first detected, the signal generator circuit 61A executes the operation when the occurrence of a reverse current Ir has been detected (that is, the operation that stops the outputting of the two main drive signals Sa and Sb, the first drive signal Sx, and the second drive signal Sy) with hardly any delay from the reverse current Ir occurring. By doing so, despite having a simple configuration where an existing component, the current detector 9 for detecting an overcurrent state for the output current Io, is further used to detect the occurrence of a reverse current Ir, the power supply 1A is capable of detecting the occurrence of a reverse current Ir and stopping the switching operations of the switch 4A and the synchronous rectifier 5. In addition, since the power supply 1A is configured to use the logical OR signal Sor of the main drive signals Sa and Sb as a signal (a reference signal) for determining whether a reverse current Ir has occurred, the signal can be generated by merely using an OR element or executing an OR process, which makes it possible to detect the occurrence of a reverse current Ir with a much simpler configuration.

In this way, according to the power supply 1A, in a configuration including the current detector 9 that detects the current Ii flowing in the switch 4A and outputs the output current detection signal Si (that is, a configuration already provided with the current detector 9 for detecting an overcurrent state for the output current Io), the controller 10A further includes the logical OR circuit 62, which generates the logical OR signal Sor for the two main drive signals Sa and Sb, and the reverse current determination circuit 63, which determines, based on the logical OR signal Sor and the output current detection signal Si, that a reverse current Ir has occurred when outputting of the output current detection signal Si has been detected in the stopped period Tstp where the main drive signals Sa and Sb in the logical OR signal Sor are both in an outputting stopped state, and outputs the reverse current detection signal Srv, and when the reverse current detection signal Srv has been outputted, the signal generator circuit 61A stops the outputting of the two main drive signals Sa and Sb, the first drive signal Sx, and the second drive signal Sy.

Accordingly, with the power supply 1A, with a simple configuration that further uses the current detector 9, which is already provided to detect an overcurrent for the output current Io, as a component element for detecting the occurrence of a reverse current Ir, it is possible to detect the occurrence of a reverse current Ir and to stop switching operations of the switch 4A and the synchronous rectifier 5. This means that according to the power supply 1A, it is possible to prevent a situation where a reverse current Ir continuously occurs. In addition, since the power supply 1A is configured to use the logical OR signal Sor for the main drive signals Sa and Sb as a signal for determining whether a reverse current Ir has occurred and it is possible to generate the logical OR signal Sor merely by an OR element as hardware or an OR process as software, it is possible to detect the occurrence of a reverse current Ir with a much simpler configuration.

Also, according to the power supply 1A, since the reverse current determination circuit 63 is configured to detect the stopped period Tstp in the logical OR signal Sor using the first threshold voltage values $V_{TH1}$ and detect the outputting of the output current detection signal Si using the second threshold voltage values $V_{TH2}$, even when a certain amount of noise is superimposed on the low-side potential and high-side potential periods of the logical OR signal Sor and/or the output current detection signal Si, it is still possible to stably detect the stopped period Tstp in the logical OR signal Sor and outputting of the output current detection signal Si. As a result, it is possible to stably determine (detect) the occurrence of a reverse current Ir.

Note that although a power supply 1A composed of a switch 4A with a circuit configuration that is one of a half-bridge circuit and a push-pull circuit including the two main switching elements 31 and 32 has been described above, the present invention is not limited to this. As one example, it is also possible to construct the switch of a full-bridge circuit including four main switching elements. A power supply 1B that uses this configuration will now be described with reference to FIG. 4 and FIGS. 6 to 9. Note that configurations that are the same as the power supply 1A described above have been assigned the same reference numerals and duplicated description is omitted.

Figure 6:
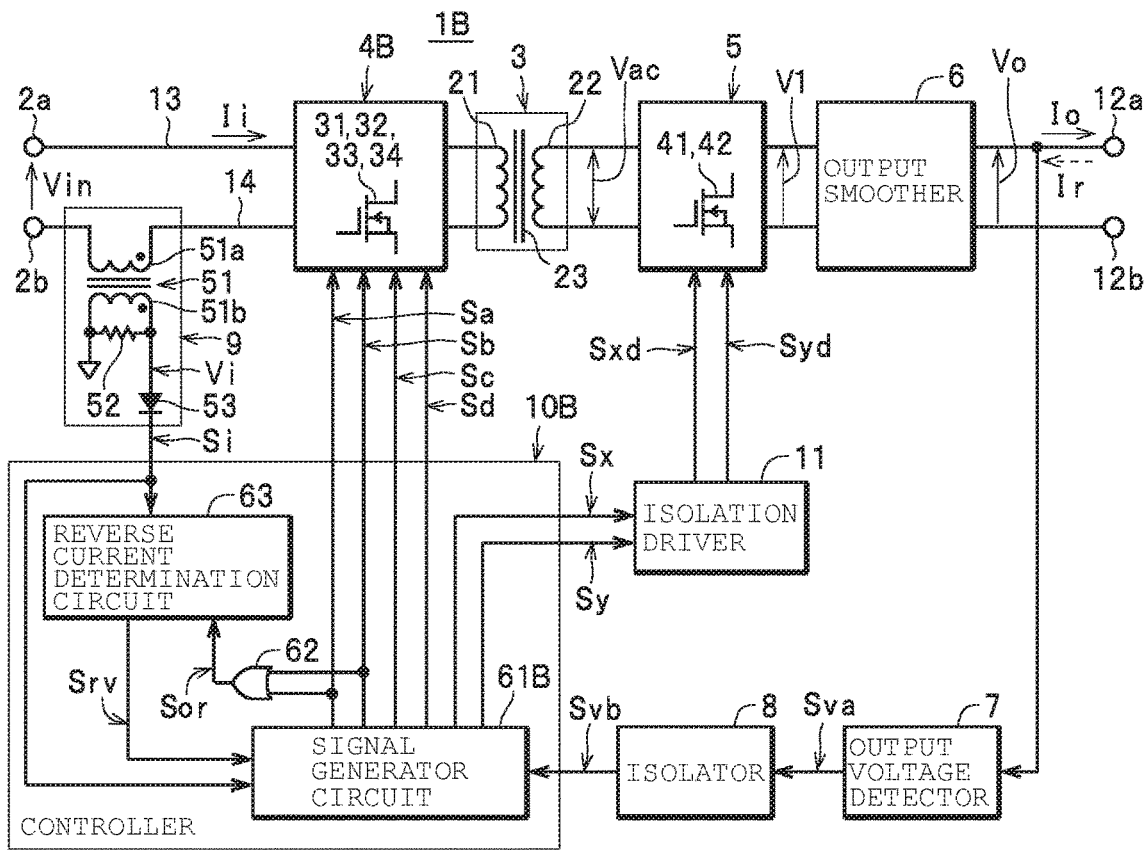
FIG. 6 depicts the configuration of another power supply.
Figure 7:
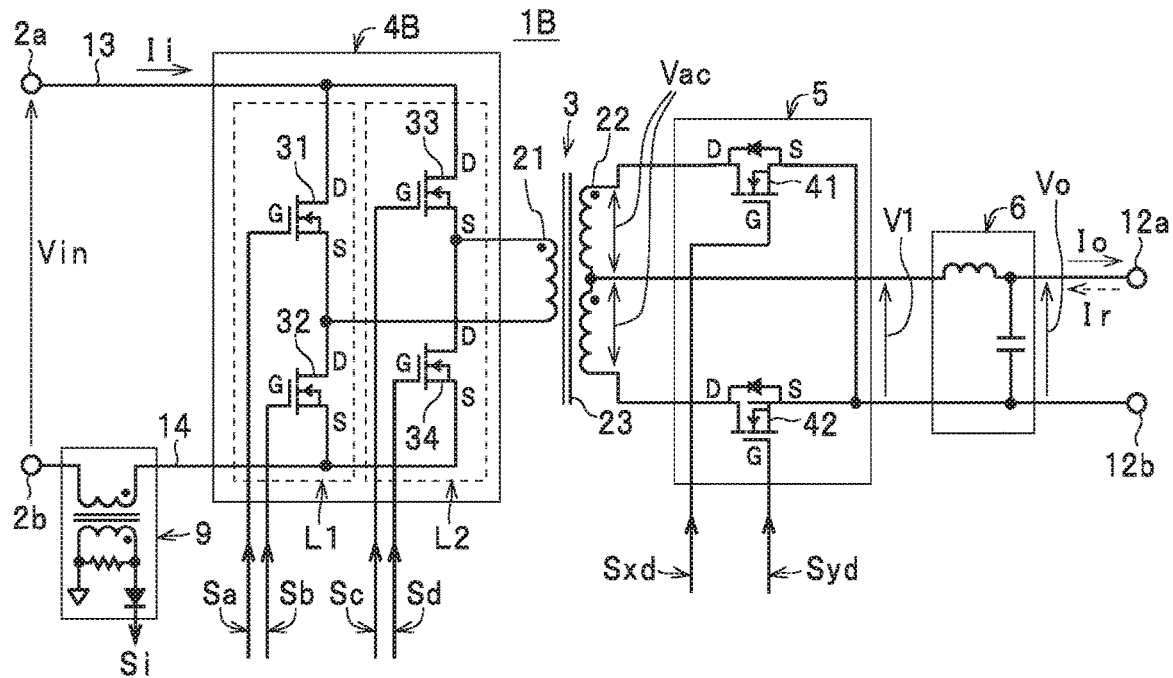
FIG. 7 is a circuit diagram depicting one example of a switch with a full-bridge configuration, an isolation transformer, a synchronous rectifier, and an output smoother.

As depicted in FIGS. 6 and 7, as one example, the power supply 1B includes the pair of input terminals 2a and 2b, the isolation transformer 3, a switch 4B, the synchronous rectifier 5, the output smoother 6, the output voltage detector 7, the isolator 8, the current detector 9, a controller 10B, the isolation driver 11, and the pair of output terminals 12a and 12b. The power supply 1B generates the DC output voltage Vo based on the DC input voltage Vin inputted across the input terminals 2a and 2b and outputs to a load, not illustrated, connected across the output terminals 12a and 12b.

The switch 4B is constructed of a full-bridge circuit including four main switching elements 31, 32, 33, and 34. In more detail, as depicted in FIG. 7, the switch 4B is configured with a first leg L1, which is composed of the two main switching elements 31 and 32 that are connected in series, and a second leg L2, which is composed of the two main switching elements 33 and 34 that are connected in series, with the two legs L1 and L2 connected in parallel between the pair of DC power supply lines 13 and 14 on which the DC input voltage Vin is supplied. The primary winding 21 of the isolation transformer 3 has one end connected to a connection point between the main switching elements 31 and 32 and another end connected to a connection point between the main switching elements 33 and 34.

Figure 8:
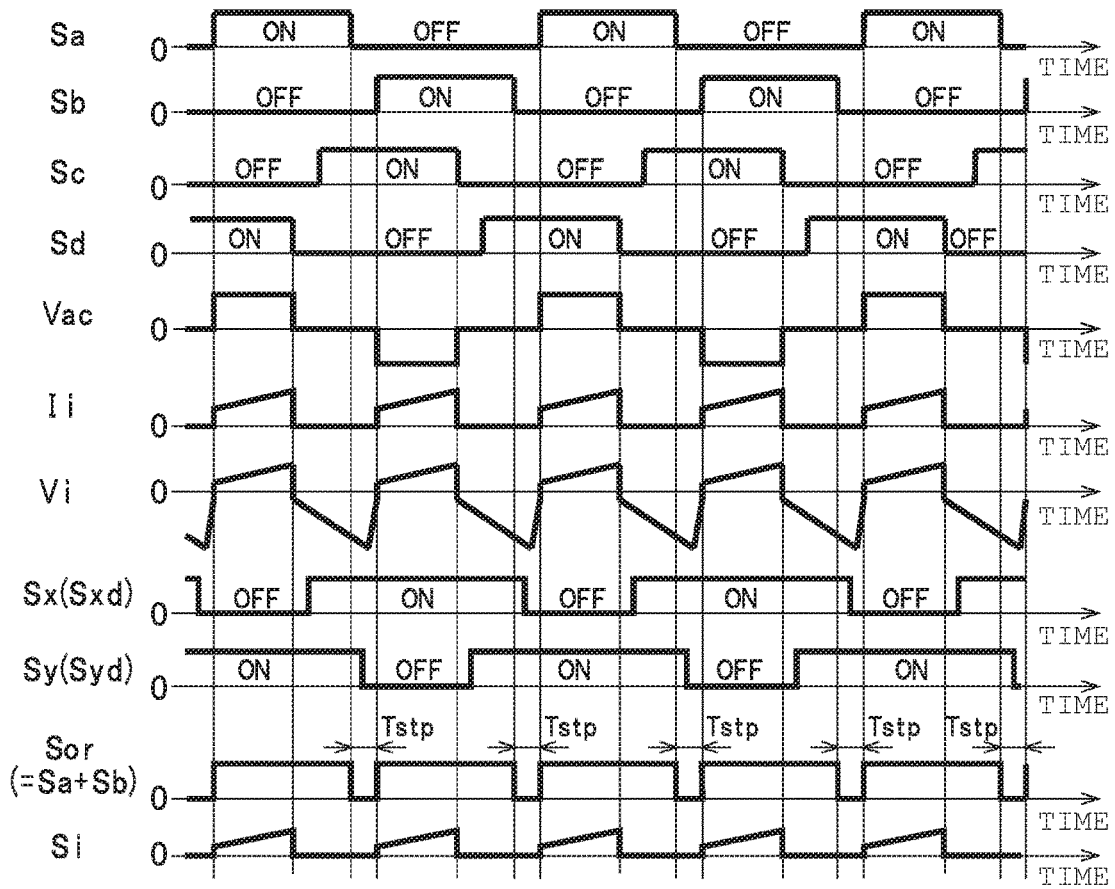
FIG. 8 is a waveform diagram useful in explaining the operation in a normal state (a state where an output current is flowing from the other power supply to the load) when this other power supply is configured to perform a phase-shifting operation.
Figure 9:
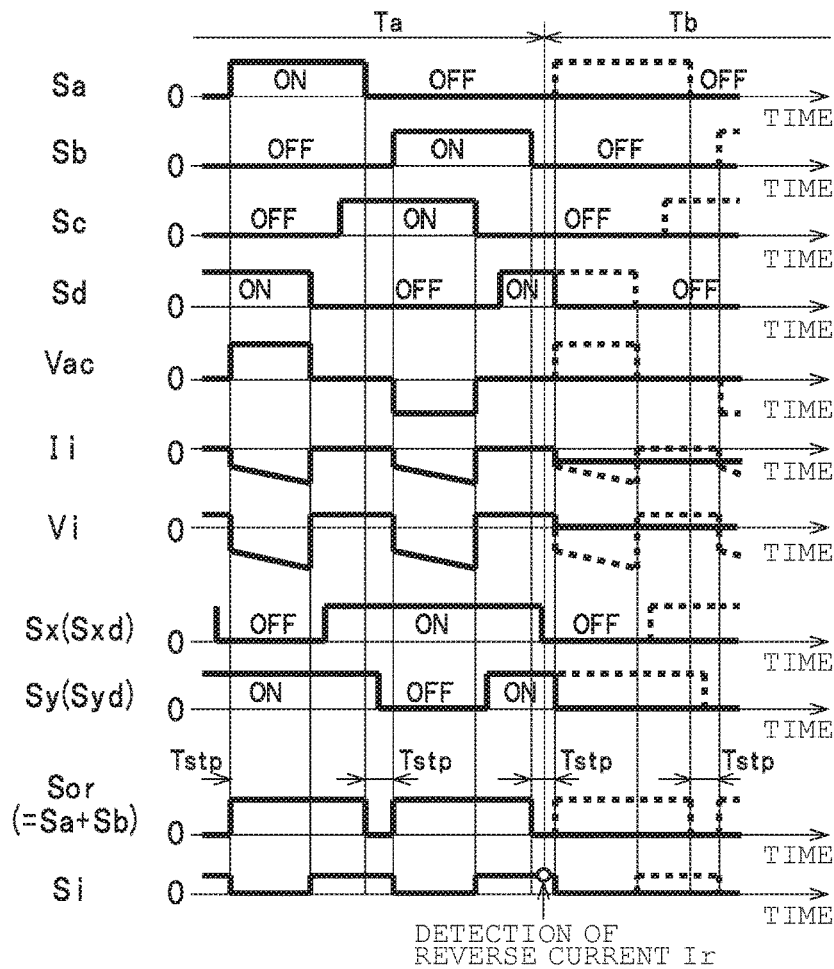
FIG. 9 is a waveform diagram useful in explaining an operation in a reverse current state (a state where a reverse current is flowing from the load toward the other power supply) when this other power supply is configured to perform a phase-shifting operation.

The switch 4B intermittently applies the DC input voltage Vin to the primary winding 21 due to the main switching elements 31, 32, 33, and 34, which are controlled according to PWM, switching according to the corresponding main drive signals Sa, Sb, Sc, and Sd supplied at the timing depicted in FIGS. 4 and 5, or due to the main switching elements 31, 32, 33, and 34, which are controlled according to phase shifting, switching according to the corresponding main drive signals Sa, Sb, Sc, and Sd supplied at the timing depicted in FIGS. 8 and 9. By doing so, the AC voltage (induced voltage) Vac is induced in the secondary winding 22 of the isolation transformer 3 at the timing depicted in FIGS. 4 and 5 or FIGS. 8 and 9. Although the main switching elements 31, 32, 33, and 34 are composed of n-channel MOSFETs for example, the present invention is not limited to this, and may use a variety of semiconductor switches, such as bipolar transistors. Although the main switching elements 31, 32, 33, and 34 of the switch 4B are controlled in this way according to one of PWM and phase shifting, a configuration that is controlled according to PWM will be described first.

The current detector 9 has the same configuration as the power supply 1A described above. Accordingly, when the main switching elements 31, 32, 33, and 34 are performing switching operations, the voltage signal Vi with the signal waveform depicted in FIGS. 4 and 5 is generated at the other end of the secondary winding 51*b* of the current transformer 51.

When the power supply 1B is in the normal state (a state where the output current Io is flowing from the power supply 1B toward the load), the current Ii flows to the switch 4B in the direction (the forward direction) indicated in FIGS. 6 and 7 during an ON period where the main switching element 31 corresponding to the main drive signal Sa and the main switching element 34 corresponding to the main drive signal Sd are both on and an ON period where the main switching element 32 corresponding to the main drive signal Sb and the main switching element 33 corresponding to the main drive signal Sc are both on. This means that as depicted in FIG. 4, during the ON period, the voltage signal Vi is outputted as a signal composed of a positive-side waveform. During an OFF period (that is also the stopped period Tstp) where the main switching elements 31, 32, 33, and 34 are all off, a reset current (that is, a current in the reverse direction to the current that flows during the ON period) flows via the resistor 52 to the secondary winding 51*b* of the current transformer 51. This means that as depicted in FIG. 4, during the OFF period, the voltage signal Vi is outputted as a signal composed of a negative-side waveform.

As a result, in the power supply 1B also, due to the rectifier circuit 53 rectifying the voltage signal Vi, the current detector 9 outputs the output current detection signal Si that changes as depicted in FIG. 4 during the normal state and changes as depicted in FIG. 5 during the reverse current state in the same way as the power supply 1A described above.

As one example, the controller 10B includes a signal generator circuit 61B, the logical OR circuit 62, and the reverse current determination circuit 63.

The signal generator circuit 61B inputs the voltage detection signal Svb, generates the four main drive signal Sa, Sb, Sc, and Sd for driving the four main switching elements 31, 32, 33, and 34 based on the voltage value of the DC output voltage Vo indicated by the voltage detection signal Svb with the timing depicted in FIGS. 4 and 5, and outputs to the gate terminals of the corresponding main switching elements 31, 32, 33, and 34. The signal generator circuit 61B also controls the duty ratios of the main drive signals Sa, Sb, Sc, and Sd to control the on-duties of the main switching elements 31, 32, 33, and 34 and thereby perform control to set the voltage value of the DC output voltage Vo at a predetermined target voltage value. The signal generator circuit 61B determines, based on the output current detection signal Si, whether the current value of the detected output current Io has reached a predetermined upper limit current value (that is, whether there is an overcurrent) and when the current value of the output current Io has reached the upper limit current value (that is, there is an overcurrent), controls the duty ratios of the main drive signals Sa, Sb, Sc, and Sd to control the on-duties of the main switching elements 31, 32, 33, and 34, lower the voltage value of the DC output voltage Vo, and thereby prevent the current value of the output current Io from exceeding the upper limit current value. As depicted in FIGS. 4 and 5, the signal generator circuit 61B generates and outputs a first drive signal Sx for driving the first synchronous rectifier element 41 and a second drive signal Sy for driving the second synchronous rectifier element 42 based on the generation timing of the main drive signals Sa, Sb, Sc, and Sd. When a reverse current detection signal Srv, described later, is outputted from the reverse current determination circuit 63, the signal generator circuit 61B stops outputting the four main drive signals Sa, Sb, Sc, and Sd, the first drive signal Sx, and the second drive signal Sy.

The logical OR circuit 62 generates and outputs a logical OR signal Sor (=Sa+Sb) for two main drive signals for two main switching elements that construct one leg out of the pair of legs L1 and L2 (as one example in the present embodiment, as depicted in FIGS. 4 and 5, the two main drive signals Sa and Sb for the main switching elements 31 and 32 that construct the first leg L1). Based on the logical OR signal Sor and the output current detection signal Si, the reverse current determination circuit 63 detects whether the output current detection signal Si is being outputted during the stopped period Tstp where the two main drive signals Sa and Sb in the logical OR signal Sor are both in the outputting stopped state. When outputting of the output current detection signal Si during the stopped period Tstp has been detected, the reverse current determination circuit 63 determines that a reverse current from the output smoother 6 to the synchronous rectifier 5 has occurred and outputs the reverse current detection signal Srv to the signal generator circuit 61B.

The power supply 1B with the configuration described above differs to the power supply 1A described above in that the switch 4B is composed of the four main switching elements 31, 32, 33, and 34 and the signal generator circuit 61B generates and outputs the four main drive signals Sa, Sb, Sc, and Sd corresponding to these main switching elements 31, 32, 33, and 34. However, with a configuration where the main switching elements 31, 32, 33, and 34 are controlled according to PWM as in this embodiment, the component elements of the power supply 1B operate in the same way as the component elements of the power supply 1A, and therefore the signal waveforms for the component elements are the same as the power supply 1A as depicted in FIGS. 4 and 5. This means that in the controller 10B, in the same way as the controller 10A, the reverse current determination circuit 63 can determine, based on whether outputting of the output current detection signal Si has been detected in the stopped period Tstp where the two main drive signals Sa and Sb in the logical OR signal Sor are both in the outputting stopped state, whether a reverse current Ir has occurred and output the reverse current detection signal Srv.

Accordingly, with the power supply 1B configured so that the main switching elements 31, 32, 33, and 34 are controlled according to PWM, it is possible to achieve the same effects as the power supply 1A described above.

Next, a configuration where the main switching elements 31, 32, 33, and 34 of the power supply 1B are controlled according to phase shifting will be described. Note that configurations that are the same as in the configuration controlled according to PWM described above have been assigned the same reference numerals and duplicated description has been omitted.

In the power supply 1B of this configuration, as described above, when the generation timing of the main drive signals Sa, Sb, Sc, and Sd by the signal generator circuit 61B, that is, the on/off timing of the main switching elements 31, 32, 33, and 34 corresponding to the main drive signals Sa, Sb, Sc, and Sd is the timing depicted in FIGS. 8 and 9, this differs from the configuration that is controlled according to PWM (a configuration where the generation timing of the main drive signals Sa, Sb, Sc, and Sd, that is, the on/off timing of the main switching elements 31, 32, 33, and 34 corresponding to the main drive signals Sa, Sb, Sc, and Sd is the timing depicted in FIGS. 4 and 5). On the other hand, as depicted in FIGS. 8 and 9, the generation timing and polarity of the voltage signal Vi (that is, the generation timing of the output current detection signal Si) with respect to the logical OR signal Sor (although this is a logical OR signal for the main drive signals Sa and Sb in the present embodiment, a logical OR signal for the main drive signals Sc and Sd is also possible) in the normal state and the reverse current state have the same relationship as the configuration controlled according to PWM (a relationship where in the normal state, the output current detection signal Si is not generated in stopped periods Tstp in the logical OR signal Sor, and in the reverse current state, the output current detection signal Si is generated in stopped periods Tstp in the logical OR signal Sor).

Accordingly, with the power supply 1B configured so that the main switching elements 31, 32, 33, and 34 are controlled according to phase shifting, since it is possible for the reverse current determination circuit 63 to determine, based on whether outputting of the output current detection signal Si has been detected in the stopped period Tstp where the two main drive signals Sa and Sb in the logical OR signal Sor are in the outputting stopped state, whether the reverse current Ir has occurred and to output the reverse current detection signal Srv, it is possible to achieve the same effects as the effects of the power supply 1A described above.

By connecting a medical appliance that operates based on the DC output voltage Vo to the output terminals 12a and 12b, it is possible to use the power supplies 1A and 1B in a medical system. This medical system may also have a function that charges a secondary battery for backup purposes, for example, using the DC output voltage Vo supplied from the power supply 1A or 1B. This means that the power supply 1A or 1B that is capable of detecting the occurrence of a reverse current Ir from the medical system and switching to a stopped state is effective for this type of medical system.

Figure 10:
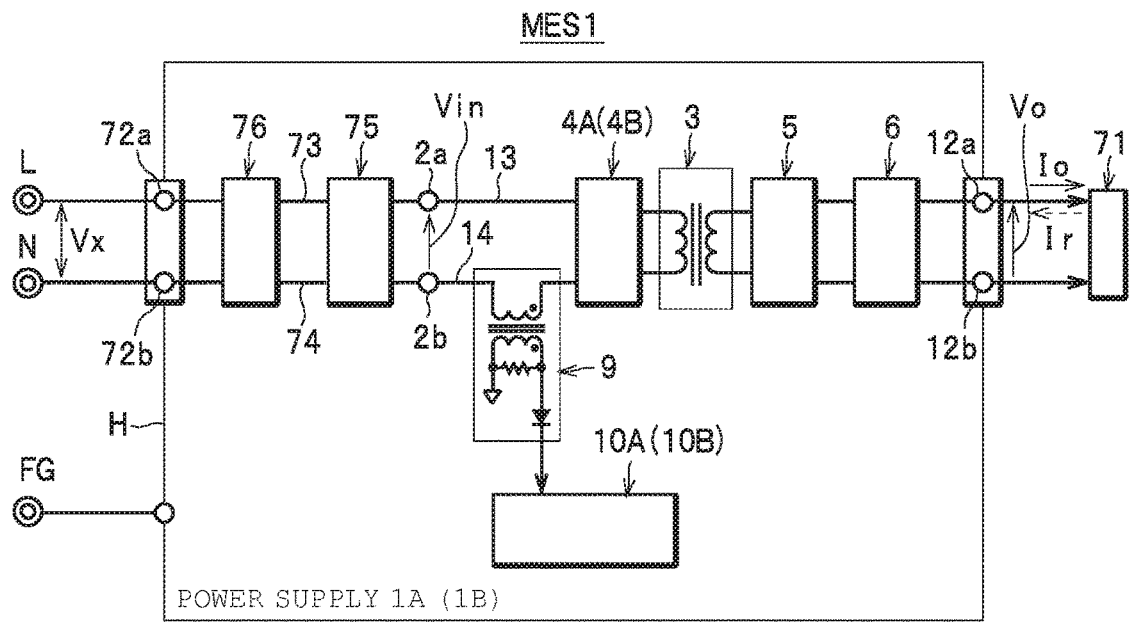
FIG. 10 is a diagram depicting the configuration of a medical system equipped with a power supply.

A medical system MES1 equipped with the power supply system 1A (or 1B) will now be described with reference to FIG. 10. Note that it is assumed here that the isolation transformer 3 of the power supply 1A (or 1B) is sufficiently isolated to meet medical standards (that is, the isolation transformer 3 has reinforced insulation). It is also assumed that a medical appliance 71 is connected to the output terminals 12a and 12b. It is further assumed that an FG line for grounding is connected to a housing H of the power supply 1A (or 1B). Note that configurations that are the same as in the configuration of the power supply 1A (or 1B) described above have been assigned the same reference numerals and duplicated description has been omitted.

In this system, the power supply 1A (or 1B) operates by inputting an AC input voltage Vx supplied across input lines (an L-phase line and an N-phase line) via a pair of AC input terminals 72a and 72b. To do so, the power supply 1A (or 1B) internally includes a rectifier/smoother 75 connected via a pair of AC power supply lines 73 and 74 to the pair of AC input terminals 72a and 72b, and is configured so that the rectifier/smoother 75 rectifies and smoothes the AC input voltage Vx inputted via the input lines L and N, the pair of AC input terminals 72a and 72b, and the pair of AC power supply lines 73 and 74 to generate a DC input voltage Vin, which is outputted to the input terminals 2a and 2b and also the DC power supply lines 13 and 14. The rectifier/smoother 75 may also include a power factor correction circuit (PFC circuit). The power supply 1A (or 1B) also internally includes a fuse 76 (or a breaker) that is interposed on the pair of AC power supply lines 73 and 74.

Since the medical system MES1 equipped with the power supply 1A (or 1B) includes the isolation transformer 3 that has reinforced insulation and the fuse 76 (or the breaker) as described above and is configured so as to be capable of meeting medical standards by itself, it is possible to realize a configuration capable of meeting medical standards without an isolation transformer and a fuse (or a breaker) being interposed outside the power supply 1A (or 1B) (in more detail, on the input lines (the L-phase line and N-phase line) connected to the power supply 1A (or 1B)). Also, according to the medical system MES1, by including the power supply 1A (or 1B), it is possible to achieve the same effects as when the power supply 1A (or 1B) described above is used on its own.

Also, although in the medical system MES1 described above, the power supply 1A (or 1B) internally includes the fuse 76 (or the breaker), it is also possible to configure a medical system using the power supply 1A (or 1B) that does not internally include the fuse 76 (or the breaker). A medical system MES2 that uses this configuration will now be described with reference to FIG. 11. Note that configurations that are the same as the medical system MES1 described above have been assigned the same reference numerals and duplicated description is omitted, with the following description instead focusing on configurations that differ to the medical system MES1.

Figure 11:
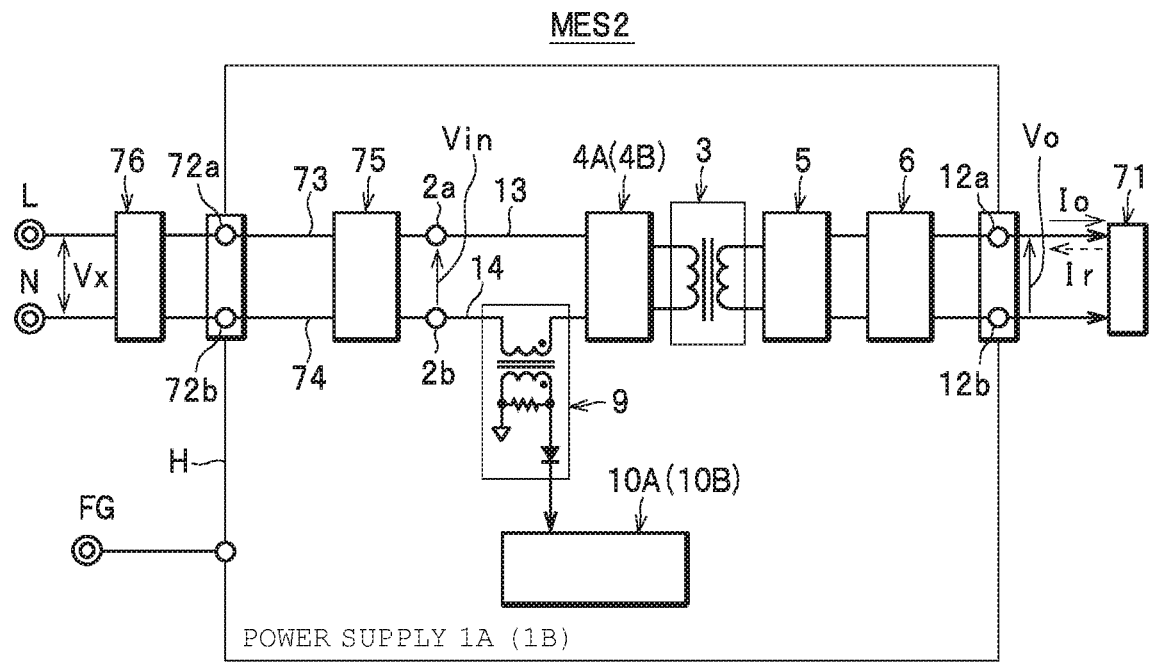
FIG. 11 is a diagram depicting the configuration of another medical system equipped with a power supply.

As depicted in FIG. 11, in this medical system MES2, the fuse 76 (or the breaker) is interposed on the input lines (the L-phase line and the N-phase line). With this configuration, the AC input voltage Vx supplied across the input lines (the L-phase line and the N-phase line) is inputted into the AC input terminals 72a and 72b of the power supply 1A (or 1B) via the fuse 76 (or the breaker).

According to the medical system MES2 equipped with the power supply 1A (or 1B), due to the power supply 1A (or 1B) including the isolation transformer 3 that has reinforced insulation as described above, it is possible to realize a configuration capable of meeting medical standards by merely interposing the fuse 76 (or the breaker) outside the power supply 1A (or 1B) (in more detail, on the input lines (the L-phase line and N-phase line) connected to the power supply 1A (or 1B)). Also, according to the medical system MES2, by including the power supply 1A (or 1B), it is possible to achieve the same effects as the power supply 1A (or 1B) alone described above.

Figure 12:
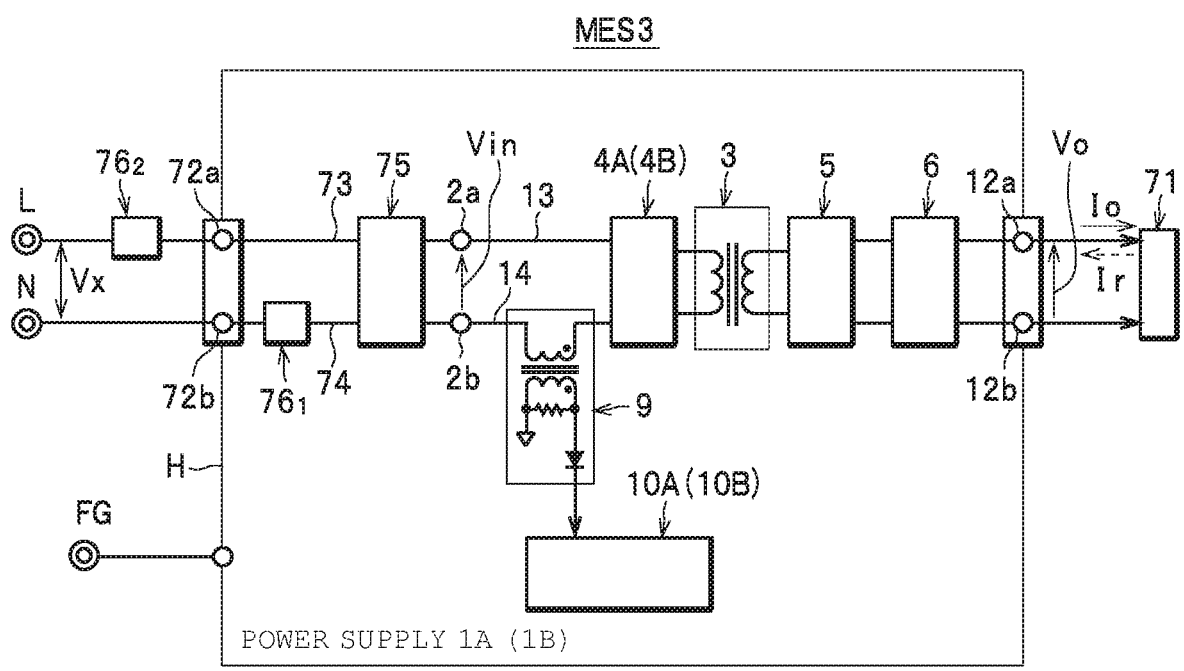
FIG. 12 is a diagram depicting the configuration of yet another medical system equipped with a power supply.

Although the medical systems MES1 and MES2 described above are configured with the fuse 76 (or the breaker) interposed only one of inside and outside the power supply 1A (or 1B), it is also possible to use a configuration where a fuse 76 (or a breaker) is interposed both inside and outside the power supply 1A (or 1B). A medical system MES3 that uses this configuration will now be described with reference to FIG. 12. Note that configurations that are the same as the medical systems MES1 and MES2 described above have been assigned the same reference numerals and duplicated description is omitted, with the following description instead focusing on configurations that differ to the medical systems MES1 and MES2.

In the medical system MES3, the power supply 1A (or 1B) internally includes a fuse $76_1$ as a first fuse (or a breaker as a first breaker) that is interposed on one AC power supply line (as one example in the present embodiment, the AC power supply line 74) out of the pair of power supply lines 73 and 74. Additionally, a fuse $76_2$ as a second fuse (or a breaker as a second breaker) is disposed outside the power supply 1A (or 1B) in a state where the fuse $76_2$ is interposed on an input line (in the present embodiment, the L-phase line) connected via an AC input terminal (in the present embodiment, the AC input terminal 72a) to the other AC power supply line (as one example in the present embodiment, the AC power supply line 73) out of the pair of AC power supply lines 73 and 74. Note that although not illustrated, it is also possible to use a configuration where the fuse $76_1$ as the first fuse (or a breaker as the first breaker) is interposed on the AC power supply line 73 and corresponding to this, the fuse $76_2$ as the second fuse (or a breaker as the second breaker) is interposed on the N-phase line.

According to the medical system MES3 equipped with the power supply 1A (or 1B), since the power supply 1A (or 1B) internally includes the isolation transformer 3 that has reinforced insulation and the fuse $76_1$ (or a breaker) interposed on one AC power supply line (the AC power supply line 74 or the AC power supply line 73) as described above, by merely interposing the other fuse $76_2$ (or a breaker) outside the power supply 1A (or 1B) (in more detail, on the input line (the L-phase line or the N-phase line) connected to the other AC power supply line out of the input lines (the L-phase line and the N-phase line) connected to the power supply 1A (or 1B)), it is possible to realize a configuration capable of meeting medical standards. Also, according to the medical system MES3, by including the power supply 1A (or 1B), it is possible to achieve the same effects as the power supply 1A (or 1B) alone described above.

What is claimed is:

1. A power supply comprising:
   an isolation transformer including a primary winding and a secondary winding;
   a switch that is configured as one of a half-bridge circuit including two main switching elements and a push-pull circuit including two main switching elements, is connected between a pair of direct current (DC) power supply lines on which a DC input voltage is supplied, and intermittently applies the DC input voltage to the primary winding;
   a synchronous rectifier that includes a first synchronous rectifier element and a second synchronous rectifier element, is connected to the secondary winding, and rectifies and outputs an induced voltage generated in the secondary winding due to intermittent application of the DC input voltage to the primary winding;
   a smoother that smoothes a voltage outputted from the synchronous rectifier and outputs as a DC output voltage;
   a controller including a signal generator circuit that generates and outputs two main drive signals for driving the two main switching elements, a first drive signal for driving the first synchronous rectifier element, and a second drive signal for driving the second synchronous rectifier element; and
   a current detector including a current transformer, which is interposed on one DC power supply line out of the pair of DC power supply lines and outputs a voltage signal whose waveform changes with a current waveform of a current that flows to the switch, and a rectifier circuit, which rectifies the voltage signal and outputs as an output current detection signal,
   wherein the controller further includes:
   a logical OR circuit that generates a logical OR signal for the two main drive signals; and a reverse current determination circuit operable when outputting of the output current detection signal is detected, based on the logical OR signal and the output current detection signal, in a stopped period where the two main drive signals in the logical OR signal are in an outputting stopped state, to determine that a reverse current from the smoother to the synchronous rectifier has occurred and output a reverse current detection signal, and
   when the reverse current detection signal is outputted, the signal generator circuit stops outputting of the two main drive signals, the first drive signal, and the second drive signal.

2. A power supply comprising:
   an isolation transformer including a primary winding and a secondary winding; a switch that is configured as a full-bridge circuit composed of a pair of legs, which each include two main switching elements connected in series, that are connected in parallel, is connected across a pair of DC power supply lines on which a DC input voltage is supplied, and intermittently applies the DC input voltage to the primary winding;
   a synchronous rectifier that includes a first synchronous rectifier element and a second synchronous rectifier element, is connected to the secondary winding, and rectifies and outputs an induced voltage generated in the secondary winding due to intermittent application of the DC input voltage to the primary winding;
   a smoother that smoothes a voltage outputted from the synchronous rectifier and outputs as a DC output voltage;
   a controller including a signal generator circuit that generates and outputs four main drive signals for driving the four main switching elements, a first drive signal for driving the first synchronous rectifier element, and a second drive signal for driving the second synchronous rectifier element; and
   a current detector including a current transformer, which is interposed on one DC power supply line out of the pair of DC power supply lines and outputs a voltage signal whose waveform changes with a current waveform of a current that flows to the switch, and a rectifier circuit, which rectifies the voltage signal and outputs as an output current detection signal,
   wherein the controller further includes:
   a logical OR circuit that generates a logical OR signal for two of the main drive signals of the two main switching elements that construct one leg out of the pair of legs; and
   a reverse current determination circuit operable when outputting of the output current detection signal is detected, based on the logical OR signal and the output current detection signal, in a stopped period where the two main drive signals in the logical OR signal are in an outputting stopped state, to determine that a reverse current from the smoother to the synchronous rectifier has occurred and output a reverse current detection signal, and when the reverse current detection signal is outputted, the signal generator circuit stops outputting of the four main drive signals, the first drive signal, and the second drive signal.

3. The power supply according to claim 1,
wherein the reverse current determination circuit determines that the reverse current has occurred by regarding a period when a voltage value of the logical OR signal has fallen below a predetermined first threshold voltage value as the stopped period and detecting when a voltage value of the output current detection signal has become equal to or greater than a predetermined second threshold voltage value as the output current detection signal being outputted.

4. The power supply according to claim 2,
wherein the reverse current determination circuit determines that the reverse current has occurred by regarding a period when a voltage value of the logical OR signal has fallen below a predetermined first threshold voltage value as the stopped period and detecting when a voltage value of the output current detection signal has become equal to or greater than a predetermined second threshold voltage value as the output current detection signal being outputted.

5. A medical system comprising:
the power supply, according to claim 1, that further includes a pair of alternating current (AC) input terminals connected to an input line, a primary-side rectifier/smoother that is connected via a pair of AC power supply lines to the pair of AC input terminals and rectifies and smoothes an AC input voltage, which is inputted via the input line, the pair of AC input terminals, and the pair of AC power supply lines, and supplies as the DC input voltage to the pair of DC power supply lines, and a fuse or a breaker interposed on the pair of AC power supply lines; and
a medical appliance that is connected downstream of the power supply and operates based on the DC output voltage from the power supply.

6. A medical system comprising:
the power supply, according to claim 2, that further includes a pair of alternating current (AC) input terminals connected to an input line, a primary-side rectifier/smoother that is connected via a pair of AC power supply lines to the pair of AC input terminals and rectifies and smoothes an AC input voltage, which is inputted via the input line, the pair of AC input terminals, and the pair of AC power supply lines, and supplies as the DC input voltage to the pair of DC power supply lines, and a fuse or a breaker interposed on the pair of AC power supply lines; and
a medical appliance that is connected downstream of the power supply and operates based on the DC output voltage from the power supply.

7. A medical system comprising:
the power supply, according to claim 3, that further includes a pair of alternating current (AC) input terminals connected to an input line, a primary-side rectifier/smoother that is connected via a pair of AC power supply lines to the pair of AC input terminals and rectifies and smoothes an AC input voltage, which is inputted via the input line, the pair of AC input terminals, and the pair of AC power supply lines, and supplies as the DC input voltage to the pair of DC power supply lines, and a fuse or a breaker interposed on the pair of AC power supply lines; and
a medical appliance that is connected downstream of the power supply and operates based on the DC output voltage from the power supply.

8. A medical system comprising:
the power supply, according to claim 4, that further includes a pair of alternating current (AC) input terminals connected to an input line, a primary-side rectifier/smoother that is connected via a pair of AC power supply lines to the pair of AC input terminals and rectifies and smoothes an AC input voltage, which is inputted via the input line, the pair of AC input terminals, and the pair of AC power supply lines, and supplies as the DC input voltage to the pair of DC power supply lines, and a fuse or a breaker interposed on the pair of AC power supply lines; and
a medical appliance that is connected downstream of the power supply and operates based on the DC output voltage from the power supply.

9. A medical system comprising:
the power supply, according to claim 1, that further includes a pair of AC input terminals connected to an input line and a primary-side rectifier/smoother that is connected to the pair of AC input terminals and rectifies and smoothes an AC input voltage, which is inputted via the input line and the pair of AC input terminals, and supplies as the DC input voltage to the pair of DC power supply lines;
a fuse or a breaker interposed on the input line; and
a medical appliance that is connected downstream of the power supply and operates based on the DC output voltage from the power supply.

10. A medical system comprising:
the power supply, according to claim 2, that further includes a pair of AC input terminals connected to an input line and a primary-side rectifier/smoother that is connected to the pair of AC input terminals and rectifies and smoothes an AC input voltage, which is inputted via the input line and the pair of AC input terminals, and supplies as the DC input voltage to the pair of DC power supply lines;
a fuse or a breaker interposed on the input line; and
a medical appliance that is connected downstream of the power supply and operates based on the DC output voltage from the power supply.

11. A medical system comprising:
the power supply, according to claim 3, that further includes a pair of AC input terminals connected to an input line and a primary-side rectifier/smoother that is connected to the pair of AC input terminals and rectifies and smoothes an AC input voltage, which is inputted via the input line and the pair of AC input terminals, and supplies as the DC input voltage to the pair of DC power supply lines;
a fuse or a breaker interposed on the input line; and
a medical appliance that is connected downstream of the power supply and operates based on the DC output voltage from the power supply.

12. A medical system comprising:
the power supply, according to claim 4, that further includes a pair of AC input terminals connected to an input line and a primary-side rectifier/smoother that is connected to the pair of AC input terminals and rectifies and smoothes an AC input voltage, which is inputted via the input line and the pair of AC input terminals, and supplies as the DC input voltage to the pair of DC power supply lines;
a fuse or a breaker interposed on the input line; and a medical appliance that is connected downstream of the power supply and operates based on the DC output voltage from the power supply.

13. A medical system comprising:
the power supply, according to claim 1, that further includes a pair of AC input terminals connected to an input line, a primary-side rectifier/smoother that is connected via a pair of AC power supply lines to the pair of AC input terminals and rectifies and smoothes an AC input voltage, which is inputted via the input line, the pair of AC input terminals, and the pair of AC power supply lines, and supplies as the DC input voltage to the pair of DC power supply lines, and a first fuse or a first breaker interposed on one AC power supply line out of the pair of AC power supply lines;
a second fuse or a second breaker interposed on the input line connected via the AC input terminal to another AC power supply line out of the pair of AC power supply lines; and
a medical appliance that is connected downstream of the power supply and operates based on the DC output voltage from the power supply.

14. A medical system comprising:
the power supply, according to claim 2, that further includes a pair of AC input terminals connected to an input line, a primary-side rectifier/smoother that is connected via a pair of AC power supply lines to the pair of AC input terminals and rectifies and smoothes an AC input voltage, which is inputted via the input line, the pair of AC input terminals, and the pair of AC power supply lines, and supplies as the DC input voltage to the pair of DC power supply lines, and a first fuse or a first breaker interposed on one AC power supply line out of the pair of AC power supply lines;
a second fuse or a second breaker interposed on the input line connected via the AC input terminal to another AC power supply line out of the pair of AC power supply lines; and
a medical appliance that is connected downstream of the power supply and operates based on the DC output voltage from the power supply.

15. A medical system comprising:
the power supply, according to claim 3, that further includes a pair of AC input terminals connected to an input line, a primary-side rectifier/smoother that is connected via a pair of AC power supply lines to the pair of AC input terminals and rectifies and smoothes an AC input voltage, which is inputted via the input line, the pair of AC input terminals, and the pair of AC power supply lines, and supplies as the DC input voltage to the pair of DC power supply lines, and a first fuse or a first breaker interposed on one AC power supply line out of the pair of AC power supply lines;
a second fuse or a second breaker interposed on the input line connected via the AC input terminal to another AC power supply line out of the pair of AC power supply lines; and
a medical appliance that is connected downstream of the power supply and operates based on the DC output voltage from the power supply.

16. A medical system comprising:
the power supply, according to claim 4, that further includes a pair of AC input terminals connected to an input line, a primary-side rectifier/smoother that is connected via a pair of AC power supply lines to the pair of AC input terminals and rectifies and smoothes an AC input voltage, which is inputted via the input line, the pair of AC input terminals, and the pair of AC power supply lines, and supplies as the DC input voltage to the pair of DC power supply lines, and a first fuse or a first breaker interposed on one AC power supply line out of the pair of AC power supply lines;
a second fuse or a second breaker interposed on the input line connected via the AC input terminal to another AC power supply line out of the pair of AC power supply lines; and
a medical appliance that is connected downstream of the power supply and operates based on the DC output voltage from the power supply.

* * * * *